(12) United States Patent
Clark et al.

(10) Patent No.: US 11,933,610 B2
(45) Date of Patent: *Mar. 19, 2024

(54) OPTICAL TOMOGRAPHY SYSTEM AND METHOD OF USING

(71) Applicant: NEC CORPORATION, Tokyo (JP)

(72) Inventors: John Kenji David Clark, Tokyo (JP); Shigeru Nakamura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/876,453

(22) Filed: Jul. 28, 2022

(65) Prior Publication Data

US 2024/0035803 A1   Feb. 1, 2024

(51) Int. Cl.
*G01B 9/02091*   (2022.01)
*G01B 9/02001*   (2022.01)

(52) U.S. Cl.
CPC ..... *G01B 9/02091* (2013.01); *G01B 9/02007* (2013.01)

(58) Field of Classification Search
CPC ............ G01B 9/02091; G01B 9/02007; G01B 9/0209; G01B 9/02002; G01B 9/02004;
(Continued)

(56) References Cited

U.S. PATENT DOCUMENTS

| 8,873,066 | B2 | 10/2014 | Ensher et al. |
| 2007/0002327 | A1* | 1/2007 | Zhou ................ G01B 9/02069 356/497 |

(Continued)

FOREIGN PATENT DOCUMENTS

| EP | 2719324 A2 | 4/2014 |
| EP | 3730034 A1 | 10/2020 |

(Continued)

OTHER PUBLICATIONS

Nishant Mohan, Ivana Stojanovic, W. Clem Karl, Bahaa E. A. Saleh, Malvin C. Teich, "Compressed sensing in optical coherence tomography," Proc. SPIE 7570, Three-Dimensional and Multidimensional Microscopy: Image Acquisition and Processing XVII, 75700L (Feb. 24, 2010); doi:; pp. 2-4 (Year: 2010).*

(Continued)

*Primary Examiner* — Uzma Alam
*Assistant Examiner* — Adrian Ignacio Silva
(74) *Attorney, Agent, or Firm* — HAUPTMAN HAM, LLP

(57) ABSTRACT

A swept-source optical coherence tomography (SS-OCT) apparatus includes a plurality of wavelength-tunable light sources. The SS-OCT apparatus includes a first optical coupler configured to receive an output from each of the plurality of wavelength-tunable light sources. The optical coupler is configured to split the received output from the plurality of wavelength-tunable light sources into a reference optical path and a sample optical path. The sample optical path is configured to illuminate a sample. The SS-OCT apparatus includes a second optical coupler configured to receive return optical signals from the reference optical path and the sample optical path, and to output an optical interference signal. The SS-OCT apparatus includes a detector configured to detect the optical interference signal; and a controller configured to receive an electrical signal based on the detected optical interference signal. The controller is configured to generate a depth profile of the sample using compressed sensing.

20 Claims, 13 Drawing Sheets

(58) Field of Classification Search
CPC ............ G01B 9/02044; G01B 9/02069; G01B 9/02083; A61B 3/102; A61B 5/0066; A61B 3/0025; A61B 3/14; A61B 3/12; G01N 2021/1787; G06T 2207/10101

See application file for complete search history.

(56) References Cited

U.S. PATENT DOCUMENTS

| | | | |
|---|---|---|---|
| 2013/0169973 A1* | 7/2013 | Inoue | G01B 9/02091 356/497 |
| 2015/0287223 A1 | 10/2015 | Bresler et al. | |
| 2017/0074640 A1* | 3/2017 | Cable | G01B 9/02083 |
| 2018/0135962 A1 | 5/2018 | Murata et al. | |
| 2018/0287697 A1 | 10/2018 | Kilper et al. | |
| 2019/0014983 A1 | 1/2019 | Chong | |
| 2019/0117076 A1 | 4/2019 | Fan et al. | |
| 2019/0377134 A1* | 12/2019 | Yi | A61B 5/0066 |
| 2020/0166328 A1 | 5/2020 | Zhou | |
| 2020/0225021 A1 | 7/2020 | Wei et al. | |
| 2021/0239450 A1* | 8/2021 | Hendon | H01L 33/0045 |

FOREIGN PATENT DOCUMENTS

| | | | |
|---|---|---|---|
| JP | 2011117789 A | * | 6/2011 |
| JP | 2014016181 A | | 1/2014 |
| WO | 2017048832 A1 | | 3/2017 |
| WO | 2022234694 A1 | | 11/2022 |

OTHER PUBLICATIONS

Talkington, Desmond Charles. "Characterization and Modeling of an O-Band 1310 nm Sampled-Grating Distributed Bragg Reflector (SG-DBR) Laser for Optical Coherence Tomography (OCT) Applications." (2013), Master's Thesis, California Polytechnic State University; pages iv, 17 (Year: 2013).*

Nemirovski et al. "On verifiable sufficient conditions for sparse signal recovery via $\zeta 1$ minimization", Math. Program., Ser. B, 127:57-88, 2011. 32pp.

J.-J. Fuchs, "On sparse representations in arbitrary redundant bases", IEEE Transactions on Information Theory, vol. 50, No. 6, Jun. 2004. 4pp.

International Search Report in PCT Application No. PCT/JP2023/027120, dated Sep. 5, 2023, 4pp.

* cited by examiner

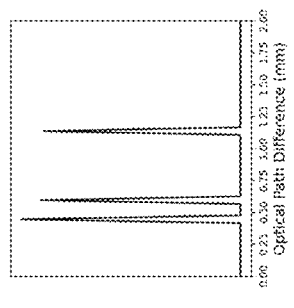
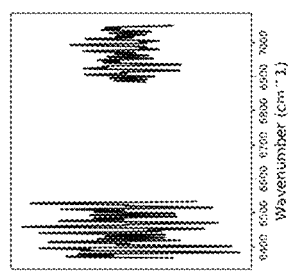
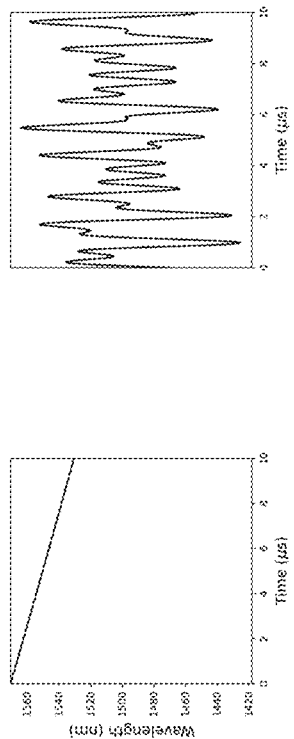
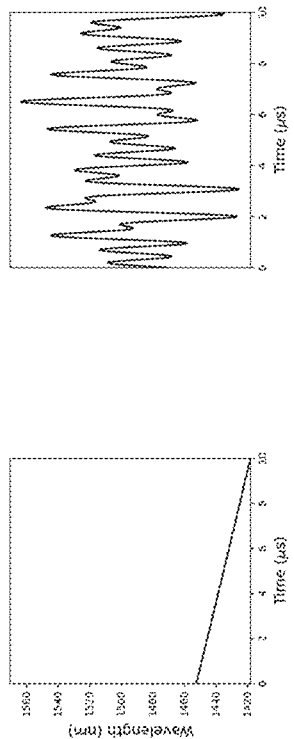
FIG. 7A  FIG. 7B  FIG. 7C  FIG. 7D  FIG. 7E  FIG. 7F

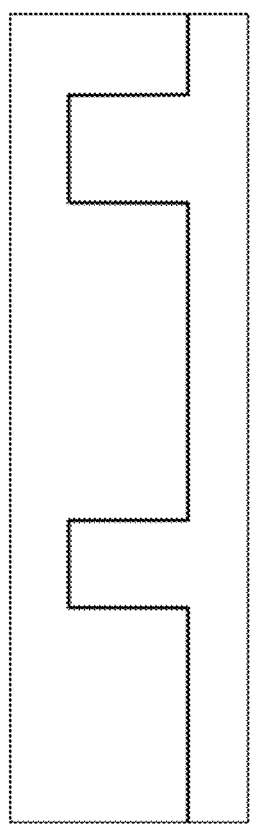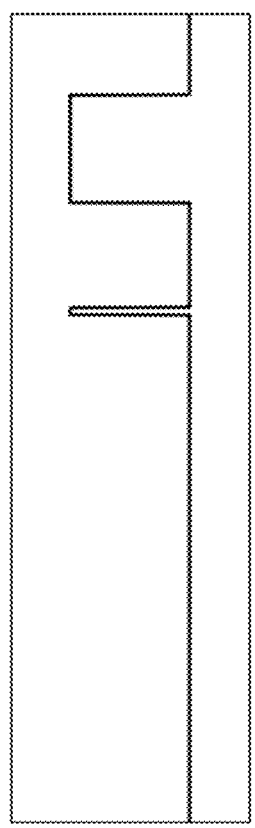
FIG. 8A
FIG. 8B

OPTICAL TOMOGRAPHY SYSTEM AND METHOD OF USING

TECHNICAL FIELD

This description relates in general to an optical coherence tomography (OCT) system and a method of using the same.

BACKGROUND

Optical Coherence Tomography (OCT) is a technique for obtaining three-dimensional images of the sub-surface structure of objects. There are two major types of OCT, time-domain OCT and frequency domain OCT. The frequency domain OCT type includes spectral domain OCT and swept-source OCT (SS-OCT). SS-OCT has achieved a large interest in recent years primarily because of the simplicity and speed of this approach. In SS-OCT, a light source with a tunable wavelength, such as a swept-source laser, is split into a sample optical signal and reference optical signal. The sample optical signal illuminates a sample and the light backscattered from the sample is collected. This backscattered light is subsequently combined with the reference optical signal, which interferes with the collected backscatter light to produce an interference signal. By sweeping the wavelength of the wavelength-tunable light source, the interference signal is measured over a finite wavelength range. By taking the Fourier Transform of the interference signal, a scattering profile of the sample in the axial direction of the sample light, henceforth referred to as the depth profile of the sample, is able to be extracted. SS-OCT has been widely applied to examine and monitor the sub-surface structure of objects in a wide variety of fields and has had a large impact in medical fields, such as ophthalmology, where SS-OCT has been used to produce three-dimensional images of the human cornea.

Although OCT has potential to achieve sub-micrometer axial resolutions, because of the Fourier relationship between the wavelength range of the interference signal and the axial resolution, the axial resolution in OCT is limited by wavelength range of the wavelength-tunable light source used. Modern swept-source lasers have typical wavelength ranges on the order of 100 nanometers (nm) to 200 nm, and this ultimately limits axial resolution to tens of micrometers for OCT. Furthermore, the use of light sources with large wavelength ranges prevents the use of low-cost semiconductor lasers, such as sampled-grating distributed Bragg reflector lasers and distributed feedback lasers, that have smaller wavelength ranges but would otherwise be suitable for OCT.

In U.S. Pat. No. 8,873,066 B2, the use of two or more swept-source lasers in a SS-OCT system is proposed to enhance the resolution up to the inverse of the wavelength separation between the wavelength ranges of the two swept-source lasers. However, the depth profile produced when measuring the interference signal of a sample over multiple wavelength ranges and applying the Fourier Transform to extract said profile exhibits strong side-lobes in addition to the real scattering peaks of the sample. These side-lobes increase the difficulty in identifying multiple scattering peaks with similar depths in the depth profile of a sample, which limits the practical application of such an arrangement.

SUMMARY

The present description provides a SS-OCT apparatus for the acquisition of tomographic images with enhanced axial resolution. The apparatus makes use of multiple wavelength-tunable light sources and compressed sensing to extract high axial-resolution depth profiles that make up the three-dimensional tomographic images.

When multiple wavelength-tunable light sources with varying tunable wavelength ranges are used in SS-OCT and the depth profiles are extracted using the Fourier transform, the separation between the wavelength ranges creates a periodicity in the interference signals measured, resulting in strong side-lobes in extracted depth profiles and making distinguishing features at similar depths in the depth profiles of samples difficult. As a result, the practical resolution obtainable by other SS-OCT arrangements is limited. This description helps to overcome this limitation of SS-OCT with multiple wavelength-tunable light sources through the use of compressed sensing to extract depth profiles and the optimization of the wavelength ranges of the multiple light sources.

Compressed sensing is a signal processing technique for the extraction of a sparse representation of a signal, x, in a sparse domain, from an under sampled or unevenly sampled measurement of the signal, y, in a measurement domain. The measured signal and sparse signal are related by a transform matrix, A, that transforms the signal from the sparse domain to the measurement domain. This forms a linear system as described by Equation (1), $$y=Ax, \qquad (1)$$

where y is an M-element vector, x is an N-element vector and A is an M×N matrix. Compressed sensing allows for the accurate extraction of x even when the linear system is underdetermined, i.e., M<N, by taking advantage of the sparsity in x and solving an optimization problem that optimizes the sparsity of x, e.g., using Equation (2), $$\min \|x\|_0 \text{ subject to } y=Ax, \qquad (2)$$

where $\|x\|_0$ is the $l_0$-norm of x. Practically, rather than solving Equation 2, the optimization problem is converted to a convex optimization problem using a loss function that favors sparse solutions, such as the LASSO, e.g., as seen in Equation (3), $$\min \frac{1}{2}\|Ax-y\|_2^2 + \alpha\|x\|_1. \qquad (3)$$

Here, $\alpha$ is a Lagrangian multiplier that accounts for noise in the measurement of the measured signal, y. The extracted x represents the true sparse representation of the signal under the condition that the transform matrix A satisfies the restricted isometry, restricted eigenvalue, or restricted correlation assumptions. However, the validation of these assumptions are non-deterministic polynomial-time (NP) hard problems and not computationally tractable. Therefore, to evaluate how reliably a sparse representation of a signal is extracted using compressed sensing, a variety of measures of suitability to sparse approximation of compressed sensing transform matrices have been proposed. One measure of suitability to sparse approximation is the mutual coherence $\mu$ of the transform matrix, given by Equation (4), $$\mu = \max_{1 \le i \ne j \le n} \frac{|A_i^H A_j|}{|A_i||A_j|}. \qquad (4)$$

Here, $A_i$ and $A_j$ are columns of the transform matrix, and the smaller the mutual coherence, the better the goodness of the mutual coherence matrix. Another measure of suitability to sparse approximation is the s-goodness of the transform matrix. An s-good matrix is a matrix that is able to accurately extract the sparse representation of a signal so long as the sparse signal has at most s non-zero values in a sparse representation of the matrix. The s-goodness of a transform matrix A is calculated by finding the largest s for which $$\gamma_s \leq \frac{1}{2},$$

e.g., using Equations (5) and (6), where $$\gamma_s = \max_x \{\|x\|_{s,1} : \|x\|_1 \leq 1 : Ax = 0\}, \quad (5)$$

$$\|x\|_{s,1} = \max_{Card(I) \leq s} \sum_{i \in I} |x_i|, \quad (6)$$

This list is not exhaustive, and other measures of suitability to sparse approximation known to a person skilled in the art exist within the literature.

The extraction of the depth profile of a sample from the interference signal collected from the sample in SS-OCT is a problem that is describable by Equation (1), where the collection of measurements of the interference signal at different wavelengths, referred to hereafter as the measured interference signal vector, equates to the vector y, the depth profile vector equates to the vector x, and the discrete Fourier transform equates to the transform matrix A. In the present description, multiple light sources with varying tunable wavelength ranges are used as light sources, the interference signal is measured over multiple wavelength ranges, and the measured interference signal vectors of the individual wavelength ranges are concatenated together to form a full measured interference signal vector. The discrete Fourier transform matrices that transform the individual measured interference signal vectors measured over the individual wavelength ranges to the depth profile vector are similarly concatenated in the first axis, i.e., the wavenumber axis, to form a full transform matrix. The high axial-resolution depth profiles are then extracted by solving for the sparse representation of the measured interference signal vector in the depth domain by convex optimization methods typical in compressed sensing, such as with the LASSO. In order for the extracted depth profile vectors to accurately represent the true depth profiles of the samples measured using the SS-OCT apparatus, the wavelength ranges of the multiple laser sources are optimized to maximize the suitability to sparse approximation of the transform matrix. Suitable wavelength ranges will depend on the number of light sources, the relative wavelength ranges of the light sources, and the target axial-resolution of the depth profiles to be extracted.

The present description enables the acquisition of high axial-resolution SS-OCT tomographic images when using multiple laser sources with tunable wavelength ranges through the application of compressed sensing to extract depth profiles and the optimization of the wavelength ranges of the multiple laser sources with tunable wavelength ranges in order to maximize the accuracy of the depth profiles extracted using compressed sensing.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 7A is a graph of a wavelength of a first light source varying in time for an SS-OCT apparatus according to some embodiments.

FIG. 7B is a graph of a wavelength of a second light source varying in time for an SS-OCT apparatus according to some embodiments.

FIG. 7C is a graph of an interference signal over the wavelength range of the first light source varying in time according to some embodiments.

FIG. 7D is a graph of an interference signal over the wavelength range of the second light source varying in time according to some embodiments.

FIG. 7E is a graph of an interference signal detected by the detector of an SS-OCT apparatus plotted in wavenumber space according to some embodiments.

FIG. 7F is a view of a depth profile obtained with an SS-OCT when compressed sensing is used to extract the depth profile from the interference signal according to some embodiments.

FIG. 8A is a view of a combination of wavelength ranges usable in an SS-OCT apparatus in accordance with some embodiments.

FIG. 8B is a view of a combination of wavelength ranges usable in an SS-OCT apparatus in accordance with some embodiments.

DETAILED DESCRIPTION

Figure 1C:
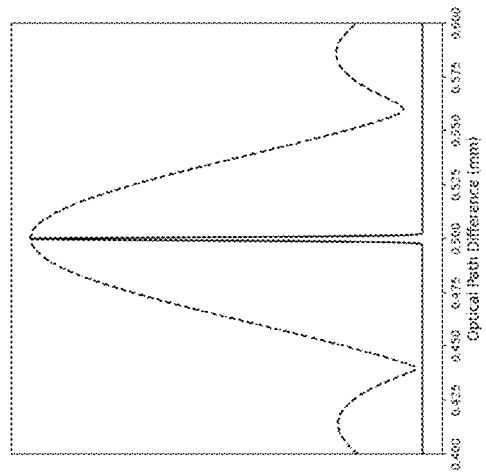
FIG. 1C is a view of depth profiles extracted from interference signals measured over a limited wavelength range according to some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

An SS-OCT apparatus is able to reduce sidelobes of a depth profile using multiple lasers having wavelengths tunable over different wavebands and extracting a depth profile of a sample using compressed sensing. The reduction of sidelobes in the depth profile improves detection of multiple peaks in the depth profile in comparison with other approaches. The ability to precisely and accurately detect multiple peaks in the depth profile help to improve reliability of the depth profile.

While much of the description below relates to two tunable lasers as light sources for the SS-OCT apparatus, one of ordinary skill in the art would understand that the use of two tunable lasers is merely exemplary of some embodiments. For example, in some embodiments, more than two tunable lasers are used as light sources for the SS-OCT apparatus. In some embodiments, a single laser having multiple tunable wavelength ranges is usable as a light source for the SS-OCT apparatus. So long as two separate wavebands are able to illuminate the sample, the light source is not limited to the examples explicitly described in this description.

Figure 1B:
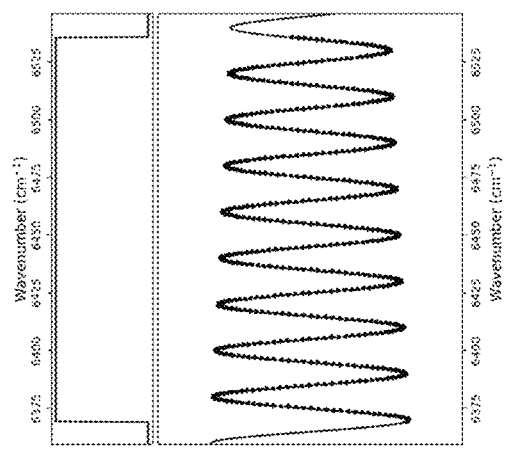
FIG. 1B is a view of an interference signal obtained from a sample with a single finite-width scattering interface and the wavelength range of a typical light source with a tunable wavelength range according to some embodiments.
Figure 1A:
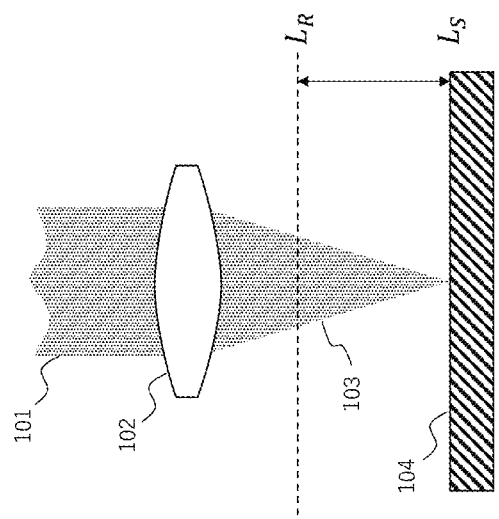
FIG. 1A is a cross-sectional view of a sample illumination section of an SS-OCT apparatus illuminating a sample with a single scattering interface of finite width according to some embodiments.

FIGS. 1A-C describe the effect of the limited wavelength range of the light source used in SS-OCT on the resolution of depth profiles obtained. FIG. 1A is a cross-sectional view of a sample illumination section of an SS-OCT apparatus illuminating a sample with a single scattering interface of finite width according to some embodiments.

A collimated sample light beam 101 is focused by an objective lens 102 into a focused sample light beam 103 that illuminates a sample 104 with a single finite width scattering interface. An example of the sample 104 includes a reflective mirror. The focused sample light beam 103 is reflected by the sample, collimated by the objective lens 102 and interfered with a reference light beam to form an interference light beam that is measured by an optical detector to produce an interference signal. The optical path length $L_S$ of the sample light path differs from the optical path length of the reference light path $L_R$, resulting in an optical path difference OPD of twice the difference in optical path lengths. This optical path difference OPD results in the intensity of the interference signal varying depending on the wavelength of the sample and reference light beams.

FIG. 1B is a view of an interference signal obtained from a sample with a single finite-width scattering interface and the wavelength range of a typical light source with a tunable wavelength range according to some embodiments. In an SS-OCT apparatus that does not include multiple tunable light sources, the wavelength range of the light source used is finite, meaning the interference signal shown in the lower figure of FIG. 1B is only able to be measured over a finite range in wavenumber space as shown by the upper figure in FIG. 1B. In the wavenumber space, the range of wavenumbers at which the interference signal that are measured are described by the raised area in the plot. The interference signal is also only sampled at discrete wavenumbers as shown by the dots in the lower figure of FIG. 1B. As would be understood by a person skilled in the art, the depth profile of a sample is typically extracted from the interference signal by taking the Fourier transform of the interference signal. In the theoretically ideal case, where the interference signal is measured from a wavenumber of 0 to a wavenumber of ∞, the depth profile will have a same width as a real scattering interface in the sample.

FIG. 1C is a view of depth profiles extracted from interference signals measured over a limited wavelength range according to some embodiments. Practically, the wavelength range of the light sources used in SS-OCT apparatus are limited and so the interference signal is only measured over a finite wavenumber range. When the Fourier transform of this limited range interference signal is taken, the extracted depth profile is broadened relative to the true depth profile, resulting in an increased full-width-at-half-maximum (FWHM), as shown by the dashed line in FIG. 1C. The FWHM is inversely related to the width of the wavelength range in wavenumber space and represents the resolution of the depth profile, as peaks with depths closer than the FWHM will appear as a single peak in the extracted depth profile.

FIGS. 2A-D include depth profiles obtained from a sample with a single scattering interface using various SS-OCT apparatuses.

Figure 2A:
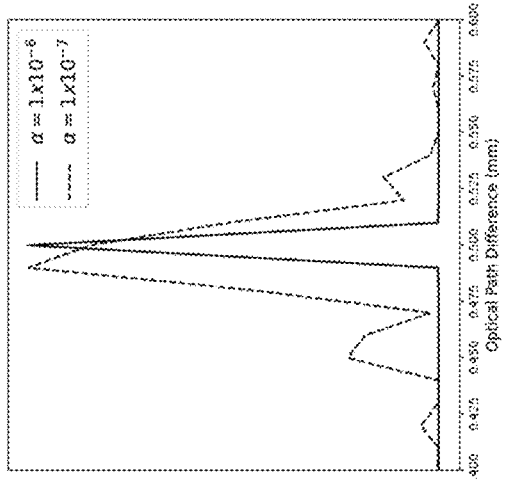
FIG. 2A is a view of a depth profile obtained from a sample with a single scattering interface when a single light source with a wavelength tunable over a first range is used and the Fourier transform is used to extract the depth profile according to some embodiments.

FIG. 2A is a view of a depth profile obtained from a sample with a single scattering interface when a single light source with a wavelength tunable over a first range is used and the Fourier transform is used to extract the depth profile according to some embodiments. FIG. 2A includes a depth profile when the depth profile is extracted using the Fourier transform from an interference signal measured over a single wavelength range. FIG. 2A includes a broad peak and sidelobes. The broad peak reduces precision of the extracted depth profile and the sidelobes reduce an ability to detect multiple peaks in the depth profile.

In an SS-OCT apparatus where a single light source with a wavelength tunable over a single wavelength range is used, the interference signal of the sample is measured over this single wavelength range, and the Fourier transform is used to extract the depth profile from the interference signal. The limited wavelength range results in the peaks of the depth profile being broader than the actual scattering interfaces in the sample. The depth profile extracted using the Fourier transform from the interference signal of a sample with a single scattering interface measured over a single wavelength range is shown in FIG. 2A. Although a single sharp scattering interface is present in the sample, the extracted depth profile shows a broad peak.

Figure 2C:
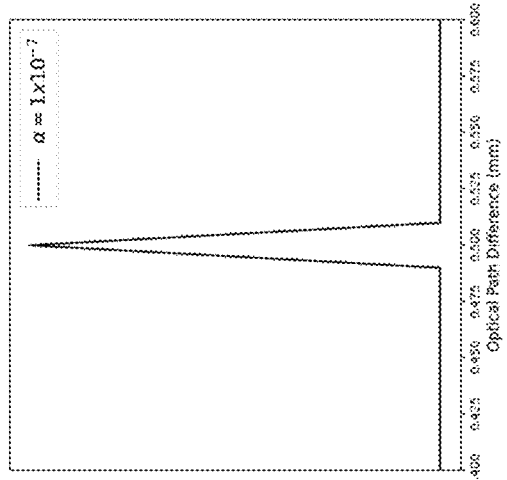
FIG. 2C is a view of a depth profile obtained from the sample when a single light source with a wavelength tunable over a first wavelength range is used and compressed sensing is used to extract the depth profile according to some embodiments.
Figure 2B:
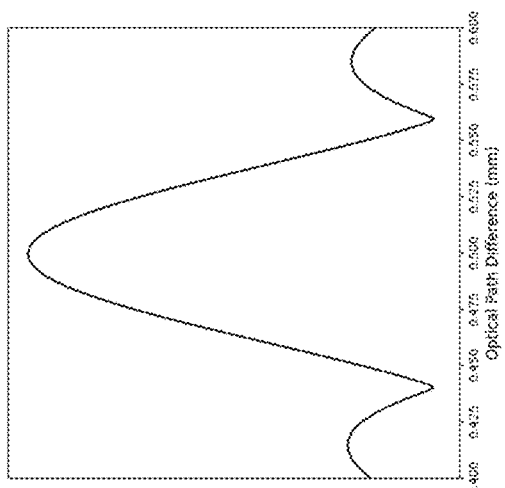
FIG. 2B is a view of a depth profile obtained from the same sample when two light sources, one with a wavelength tunable over a first range and the other with a wavelength tunable over a second range, are used and the Fourier transform is used to extract the depth profile according to some embodiments.

FIG. 2B is a view of a depth profile obtained from the same sample when two light sources, one with a wavelength tunable over a first range and the other with a wavelength tunable over a second range, are used and the Fourier transform is used to extract the depth profile according to some embodiments. FIG. 2B includes a depth profile when the depth profile is extracted using the Fourier transform from an interference signal measured over two separate wavelength ranges. In comparison with FIG. 2A, the highest peak in FIG. 2B is significantly narrower. However, a number of sides lobes and a magnitude of the sidelobes are significantly increased in FIG. 2B in comparison with FIG. 2A. Again, the sidelobes reduces an ability to reliably identify multiple peaks in the depth profile.

The addition of a second light source with a wavelength tunable over a second wavelength range allows the interfere signal to be measured over the second wavelength range as well, and when the depth profile is extracted from this extended range depth profile using the Fourier transform, a depth profile such as the one shown in FIG. 2B is obtained. Here, the central peak becomes sharper, increasing the resolution of the depth profile. However, strong side lobes that do not correspond to true interfaces in the sample appear in the depth profile. Given the magnitude of the sidelobes, distinguishing these sidelobes from peaks originating from additional real scattering interfaces within a sample with multiple reflective interfaces is difficult.

FIG. 2C is a view of a depth profile obtained from the sample when a single light source with a wavelength tunable over a first wavelength range is used and compressed sensing is used to extract the depth profile according to some embodiments. FIG. 2C includes a depth profile when the depth profile is extracted using compressed sensing by means of the LASSO from an interference signal measured over a single wavelength range. In comparison with FIG. 2B, the depth profile in FIG. 2C has significantly reduced sidelobes. However, the breadth and the accuracy of the peak in FIG. 2C is reduced in comparison with FIG. 2B.

Using compressed sensing to extract the depth profile instead of the Fourier transform is another method of enhancing the resolution of the depth profile. Using compressed sensing reduces the number of peaks that are able to be reliably extracted in the depth profile. In FIG. 2C, the depth profile extracted using compressed sensing by means of the LASSO from the interference signal of the sample with a single scattering interface measured over just the first wavelength range is displayed. A depth profile with a sharp peak, shown as the solid line, at the correct optical path difference is extracted when the Lagrangian multiplier is set to a large value. However, when the Lagrangian multiplier is decreased, as shown in the dashed line, the peak width increases, and the optical path difference of the peak no longer matches the optical path difference of the real scattering interface. When measuring samples with multiple scattering interfaces, the Lagrangian multiplier is decreased in order to for all of the reflective interfaces to appear in the depth profile. Therefore, although the depth resolution is enhanced simply by using compressed sensing to extract the depth profile, the number of peaks that capable of being extracted decreases.

Figure 2D:
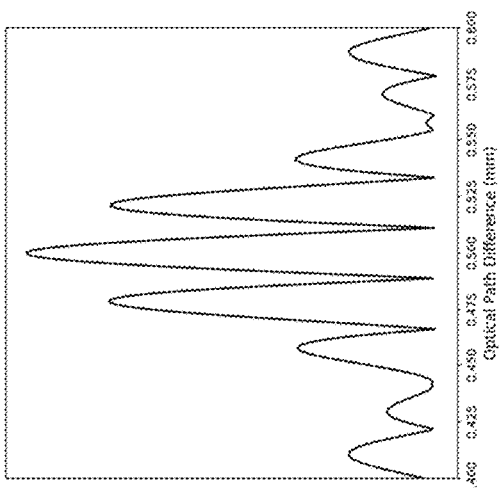
FIG. 2D is a view of a depth profile obtained from the same sample when two light sources, one with a wavelength tunable over a first range and the other with a wavelength tunable over a second range, are used and compressed sensing is used to extract the depth profile according to some embodiments.

FIG. 2D is a view of a depth profile obtained from the same sample when two light sources, one with a wavelength tunable over a first range and the other with a wavelength tunable over a second range, are used and compressed sensing is used to extract the depth profile according to some embodiments. FIG. 2D includes a depth profile when the depth profile is extracted using compressed sensing by means of the LASSO from an interference signal measured over two separate wavelength ranges as this invention teaches. The depth profile in FIG. 2D exhibits little, if any, sidelobes. In addition, the peak is narrow and accurate in the depth profile of FIG. 2D.

FIG. 2D shows the depth profile obtained using two light sources whose wavelengths are tunable over separate wavelength ranges. The wavelength ranges are chosen to minimize the mutual coherence of the matrix that transforms the depth profile vector to the measured interference signal vector. The depth profile, shown in FIG. 2D, is extracted using compressed sensing by means of the LASSO. The depth profile has a single sharp peak at the optical path difference of the sample's scattering interface, and there are no extraneous side lobes or false peaks, despite the small value of the Lagrangian multiplier. Based on the depth profiles of FIGS. 2A-2D, one of ordinary skill in the art would understand the improved performance of the SS-OCT apparatus and extraction technique associated with FIG. 2D in comparison with other approaches.

FIGS. 3A-D include depth profiles obtained from a sample with two scattering interfaces closely spaced in depth for the four cases discussed above with respect to FIGS. 2A-D. In each of FIGS. 3A-3D, the solid lines indicate the peaks associated with the known interfaces of the sample. In each of FIGS. 3A-3D, the dashed line indicates the depth profile extracted by the corresponding combination of SS-OCT apparatus and extraction technique.

Figure 3A:
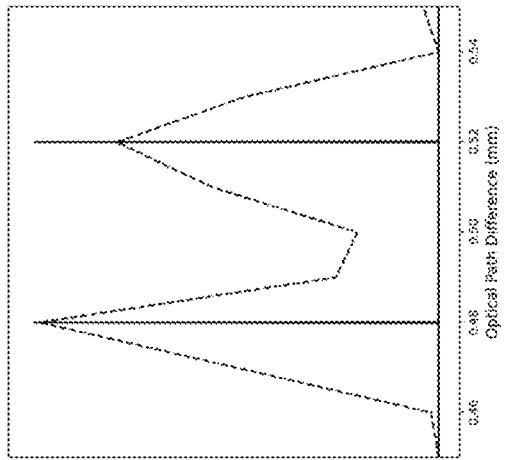
FIG. 3A is a view of a depth profile obtained from a sample with two closely spaced scattering interfaces when a single light source with a wavelength tunable over a first range is used and the Fourier transform is used to extract the depth profile according to some embodiments.

FIG. 3A is a view of a depth profile obtained from a sample with two closely spaced scattering interfaces when a single light source with a wavelength tunable over a first range is used and the Fourier transform is used to extract the depth profile according to some embodiments. In FIG. 3A, the depth profile extracted using the Fourier transform from the interference signal of a sample with two scattering interfaces measured over a single wavelength range, the dashed line. The true depth profile, the solid line, has two peaks, but as a result of the limited wavelength range and peak broadening, these two peaks appear as a single very broad peak. The measured depth profile, the dashed line, in FIG. 3A is a broad peak that is not centered on either of the two known interface locations for the sample, solid line. The single broad peak makes the identification of the interfaces exceedingly difficult.

Figure 3B:
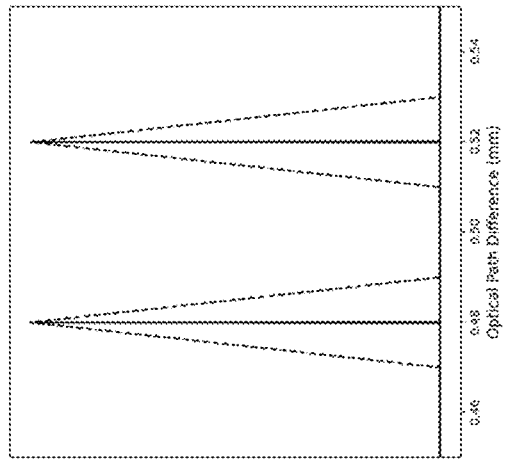
FIG. 3B is a view of a depth profile obtained from the same sample when two light sources, one with a wavelength tunable over a first range and the other with a wavelength tunable over a second range, are used and the Fourier transform is used to extract the depth profile according to some embodiments.

FIG. 3B is a view of a depth profile obtained from the same sample when two light sources, one with a wavelength tunable over a first range and the other with a wavelength tunable over a second range, are used and the Fourier transform is used to extract the depth profile according to some embodiments. When two light sources are used, the interference signal is measured over two wavelength ranges, and the Fourier transform is used to extract the depth profile, the depth profile, the dashed line in FIG. 3B, is obtained. When compared to the true depth profile, the solid line, although two sharp peaks appear at the correct optical path differences, the side lobes of the individual peaks sum together and result in additional peaks with an even larger magnitude between the two true peaks. This makes determining the true location of the peaks when they are closely spaced nearly impossible, limiting the practically obtainable resolution of the SS-OCT apparatus. The measured depth profile, the dashed line, includes four central peaks that have nearly a same magnitude. While two of the central peaks are aligned with the true depth profile, the solid line, discerning which of the central peaks of the measured depth profile, the dashed lines, indicate the actual depth profile is nearly impossible due to the similar magnitude. As a result, reliability of the combination of SS-OCT apparatus and extraction technique used to obtain the depth profile of FIG. 3B is very low.

Figure 3C:
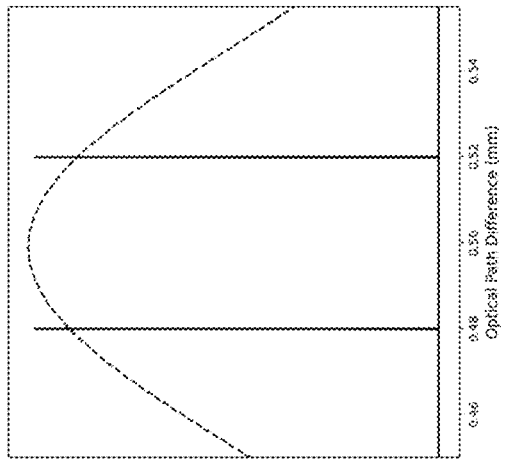
FIG. 3C is a view of a depth profile obtained from the sample when a single light source with a wavelength tunable over a first wavelength range is used and compressed sensing is used to extract the depth profile according to some embodiments.

FIG. 3C is a view of a depth profile obtained from the sample when a single light source with a wavelength tunable over a first wavelength range is used and compressed sensing is used to extract the depth profile according to some embodiments. When compressed sensing is used to extract the depth profile from the interference signal measured over a single wavelength range, the dashed line of FIG. 3C, is obtained. Though the two peaks can be distinguished, the relative magnitudes of the peaks are inaccurate. In addition, the peaks are quite broad. The inaccuracy of the peaks of the measured depth profile, the dashed line, as well as the broadness of the peaks limits the usefulness of the combination of the SS-OCT apparatus and extraction technique used to obtain the depth profile in FIG. 3C.

Figure 3D:
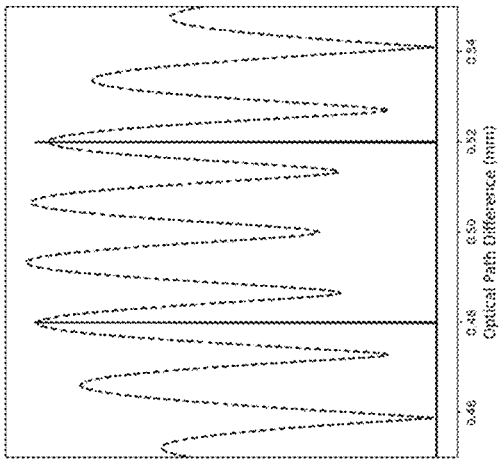
FIG. 3D is a view of a depth profile obtained from the same sample when two light sources, one with a wavelength tunable over a first range and the other with a wavelength tunable over a second range, are used and compressed sensing is used to extract the depth profile according to some embodiments.

FIG. 3D is a view of a depth profile obtained from the same sample when two light sources, one with a wavelength tunable over a first range and the other with a wavelength tunable over a second range, are used and compressed sensing is used to extract the depth profile according to some embodiments. When the interference signal is measured over two wavelength ranges that minimize the mutual coherence of the matrix that transforms the depth profile vector to the measured interference signal vector and compressed sensing is used to extract the depth profile, the two peaks are accurately extracted with a high resolution, as shown by the dashed line in FIG. 3D. Each of the two peaks of the measured depth profile, the dashed line, are centered on the true depth profile, the solid line. Additionally, the magnitude of the measured depth profile, the dashed line, is equal to the true depth profile. The breadth of the measured depth profile is also less than in FIG. 3C. Based on the depth profiles of FIGS. 3A-3D, one of ordinary skill in the art would recognize that the combination of SS-OCT apparatus and extraction technique used for FIG. 3D provides significant improvements in precision and accuracy in identifying depth profiles having multiple peaks in comparison with other approaches.

Figure 4B:
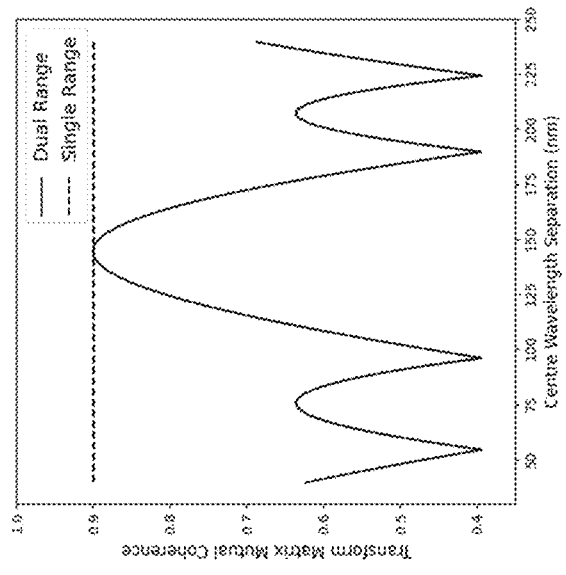
FIG. 4B is a graph of a mutual coherence of the transform matrix versus a center wavelength separation when two light sources whose wavelength ranges have identical width in wavenumber space but different center wavelengths are used in SS-OCT and the depth interval of the depth profile is set to one fourth the inverse of the width of the wavelength ranges in wavenumber space according to some embodiments.
Figure 4A:
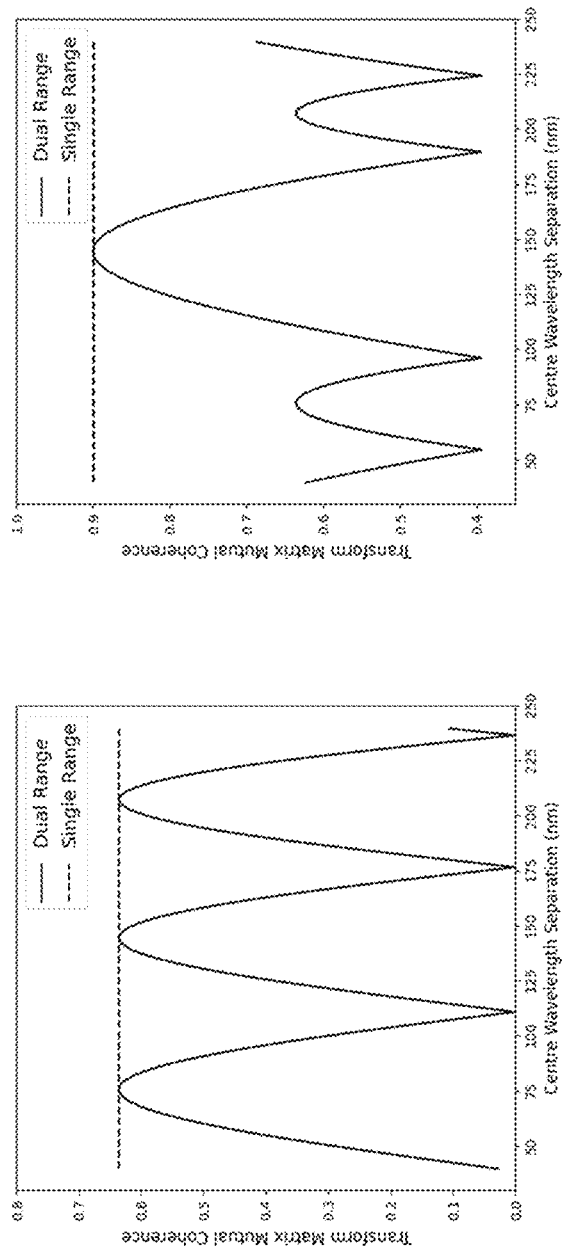
FIG. 4A is a graph of a mutual coherence of the transform matrix versus a center wavelength separation when two light sources whose wavelength ranges have identical width in wavenumber space but different center wavelengths are used in SS-OCT and the depth interval of the depth profile is set to one half the inverse of the width of the wavelength ranges in wavenumber space according to some embodiments.

FIGS. 4A-B are graphs of a mutual coherence of a transform matrix versus center wavelength separation. When compressed sensing is used to extract depth profiles from interference signals in SS-OCT, the accuracy of the depth profiles depends on both the wavelengths at which the interference signal is measured and the depth interval of the depth profile vector to be extracted. As discussed above, various measures of suitability to sparse approximation exist to predict whether a given combination of wavelengths and depth interval will be able to reliably extract accurate depth profiles. One such measure of suitability to sparse approximation is the mutual coherence of the transform matrix that transforms the depth profile vector to the measured interference signal vector. When two light sources that have wavelength ranges with equal widths in wavenumber space but different center wavelengths are used, the mutual coherence changes with the separation between the center wavelengths. The variation and separation between the wavelength ranges which is most suitable for a specific sample depends on the depth interval of the depth profile.

FIG. 4A is a graph of a mutual coherence of the transform matrix versus center wavelength separation when two light sources whose wavelength ranges have identical width in wavenumber space but different center wavelengths are used in SS-OCT and the depth interval of the depth profile is set to one half the inverse of the width of the wavelength ranges in wavenumber space according to some embodiments. FIG. 4A includes a plot indicating how the mutual coherence of the transform matrix changes with the separation between the center wavelengths when the depth interval is set to half of the inverse of the width in wavenumber space of a single wavelength range. The mutual coherence of the transform matrix for both wavelength ranges, the solid line, is compared to the mutual coherence of the transform matrix for a single range, the dashed line. One of ordinary skill in the art would understand that depending on the choice of wavelength ranges, achieving a vast reduction, or very little improvement, in the mutual coherence is possible compared to when a single light source is used.

FIG. 4B is a graph of a mutual coherence of the transform matrix versus center wavelength separation when two light sources whose wavelength ranges have identical width in wavenumber space but different center wavelengths are used in SS-OCT and the depth interval of the depth profile is set to one fourth the inverse of the width of the wavelength ranges in wavenumber space according to some embodiments. FIG. 4B indicates a plot of the mutual coherence with separation between the center wavelengths for the same case as in FIG. 4A. In contrast with FIG. 4A, the depth interval is set to one fourth of the inverse of the width in wavenumber space of a single wavelength range. Once again, the mutual coherence is decreased for some separation distances, thus improving the reliability of the extracted depth profiles, but there is no change in the mutual coherence for other separation distances. In some embodiments, therefore, the wavelength ranges chosen are selected to provide a transform matrix with a reduced mutual coherence compared to when a single wavelength range is used. In some embodiments, the wavelength ranges of the multiple laser sources are chosen to increase the s-goodness of the transform matrix. One of ordinary skill in the art would understand that the wavelength range selection criteria is applicable to any measure of suitability to sparse approximation of the transform matrix.

Figure 5A:
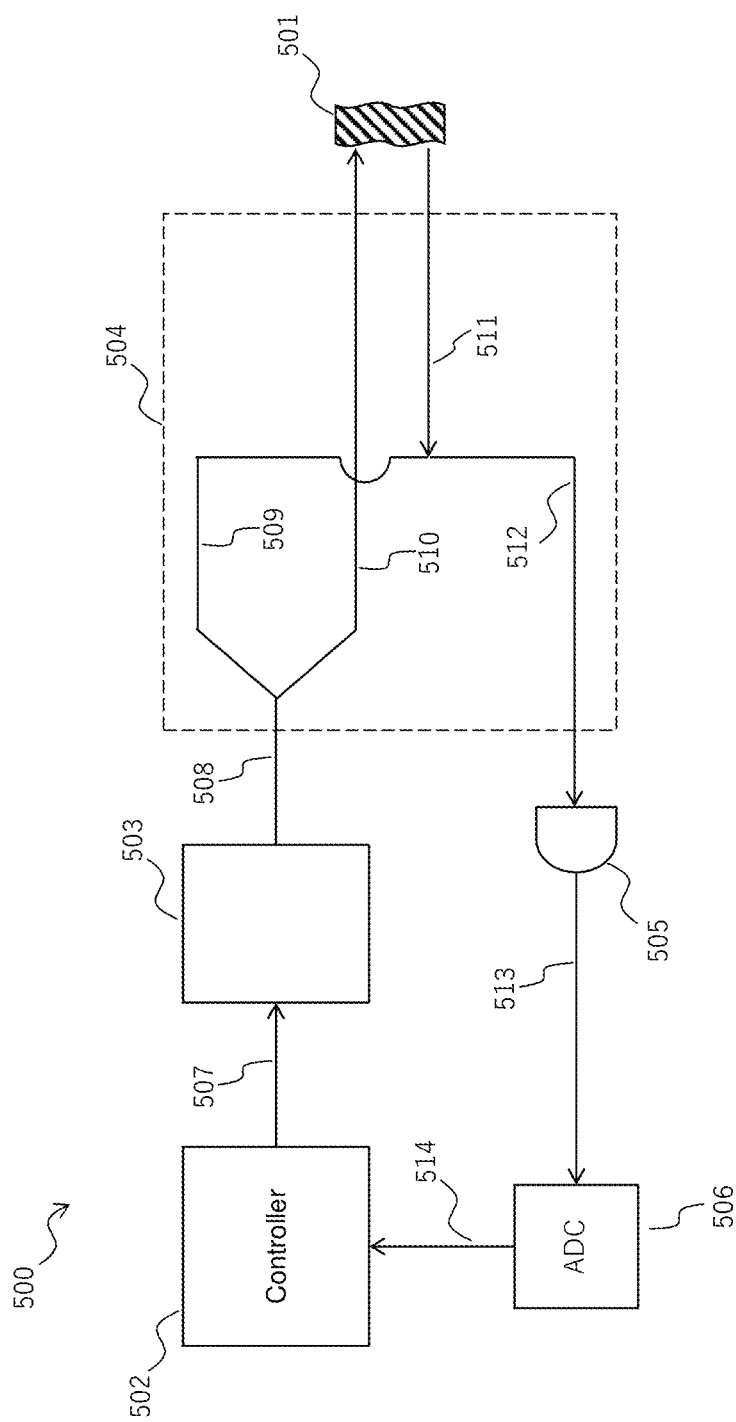
FIG. 5A is a schematic view of a SS-OCT apparatus in accordance with some embodiments.

FIG. 5A is a schematic view of an SS-OCT apparatus 500 in accordance with some embodiments. The SS-OCT apparatus 500 is usable for obtaining 3D tomographic images of a sample 501. The SS-OCT apparatus 500 includes a controller 502, multiple wavelength-tunable light sources 503, an interferometer 504, an optical detector 505 and an analog-to-digital converter (ADC) 506. The controller 502 sends an electrical control signal 507 to the multiple wavelength-tunable light sources 503 to control the wavelength output and to vary the wavelength output over time. The outputs of the multiple wavelength-tunable light sources are combined into a multiplexed optical signal 508 and input into the interferometer 504.

The interferometer 504 receives the multiplexed optical signal 508 and splits the multiplexed optical signal 508 into a reference optical signal 509 and a sample optical signal 510. The reference optical signal 509 traverses a reference path within the interferometer 504 while the sample optical signal 510 illuminates the sample 501. The light backscattered by the sample is collected as a backscattered optical signal 511, and the backscattered optical signal 511 is interfered with the reference optical signal 509 to produce an optical interference signal 512. The optical interference signal 512 is detected by the optical detector 505 and converted into an electrical interference signal 513. The electrical interference signal is then digitized by the analog-to-digital converter 506 and a digital interference signal 514 is sent to the controller 502 for processing.

The controller 502 constructs an interference signal vector from the digital interference signal 514 and applies compressed sensing to extract the depth profile vector of the sample from the interference signal vector. One of ordinary skill in the art would understand that the SS-OCT apparatus 500 is a general description. Specifics of the implementation of the SS-OCT apparatus 500 vary and some variations are discussed below. One of ordinary skill in the art would understand that the variations discussed below are not exhaustive and that other variations are within the scope of this description.

For example, a variety of components are usable to combine the laser output of the multiple light sources, such as but not limited to time multiplexing, where the outputs of the multiple wavelength-tunable light sources are staggered in time, or wavelength division multiplexing, where a wavelength division multiplexer is used to combine the optical signals of different wavelengths into a single optical fiber. The multiple wavelength-tunable light sources also encompass a large variety of possible light source combinations, for example but not limited to, multiple swept-source lasers with difference wavelength ranges, multiple semiconductor wavelength-tunable lasers with difference wavelength ranges, multiple filtered amplified spontaneous emission sources with different wavelength ranges, or any combination of these or other wavelength-tunable light sources.

The internal structure of the interferometer 504 and the reference path is also adjustable to any form compatible with SS-OCT as understood by one of ordinary skill in the art. For example, in some embodiments, the interferometer 504 includes a Michelson, a common path interferometer, or any other interferometer type compatible with SS-OCT.

Figure 5B:
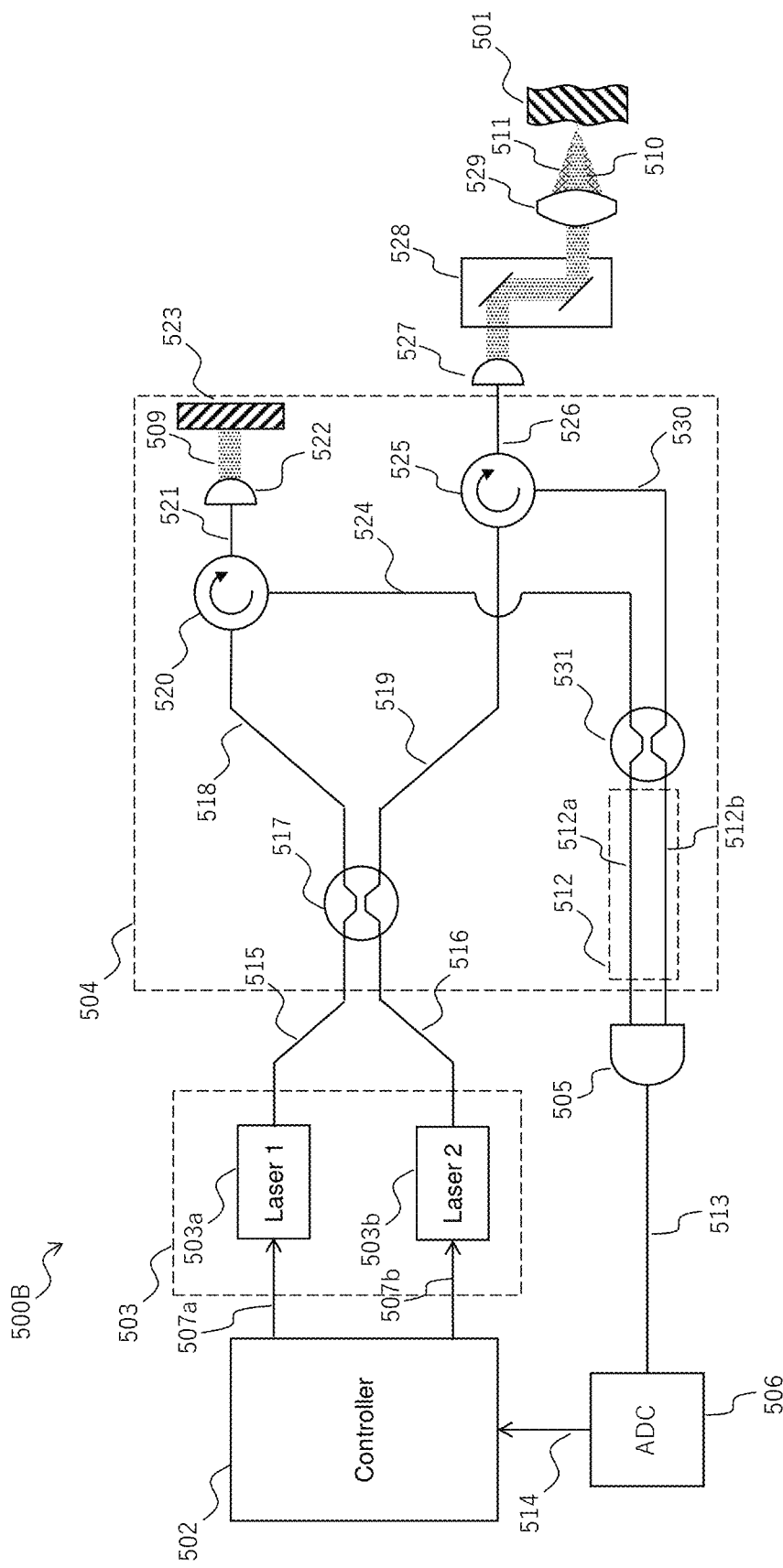
FIG. 5B is a schematic view of a SS-OCT apparatus including time multiplexing to combine the output of two wavelength-tunable light sources in accordance with some embodiments.

FIG. 5B is a schematic view of an SS-OCT apparatus 500B including time multiplexing to combine the output of two wavelength-tunable light sources in accordance with some embodiments. The SS-OCT apparatus 500B uses time multiplexing to combine the output of two light sources and the interferometer is a fiber-optic Michelson interferometer. In comparison with the SS-OCT apparatus 500, the SS-OCT apparatus 500B includes a first wavelength-tunable light source 503a and a second wavelength-tunable light source 503b. In some embodiments, the first wavelength-tunable light source 503a and the second wavelength-tunable light source 503b are laser light sources.

In the SS-OCT apparatus 500B, the electrical control signal 507 sent by the controller 502 includes a first electrical control signal 507a for controlling the wavelength of the first wavelength-tunable light source 503a and a second electrical control signal 507b for controlling the wavelength of a second wavelength-tunable light source 503b. The first electrical control signal 507a causes the wavelength of the first light source 503a to be tuned over a first wavelength range during a first time interval. The second electrical control signal 507b causes the wavelength of the second wavelength-tunable light source 503b to be tuned over a second wavelength range during a second time interval that follows the first time interval.

Figure 6A:
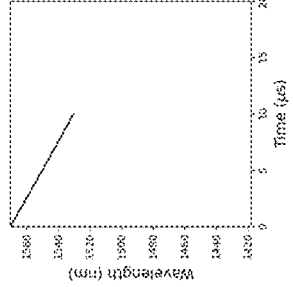
FIG. 6A is a graph of a wavelength of a first light source varying with time for an SS-OCT apparatus according to some embodiments.

FIGS. 6A-E provide supporting figures for clarifying the operation of the SS-OCT apparatus 500B and how the depth profile of a sample is extracted using the SS-OCT apparatus 500B in accordance with some embodiments. FIG. 6A is a graph of a wavelength of a first light source varying with time for an SS-OCT apparatus according to some embodiments. In some embodiments, the first electrical control signal 507a causes the first wavelength-tunable light source 503a to output a wavelength varying with time corresponding to the graph in FIG. 6A. In some embodiments, the first electrical control signal 507a is configured to cause a different output wavelength with respect to time for the first wavelength-tunable light source 503a from that shown in FIG. 6A.

Figure 6B:
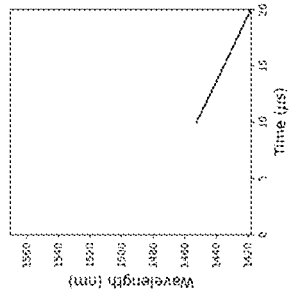
FIG. 6B is a graph of a wavelength of a second light source varying with time for an SS-OCT apparatus according to some embodiments.

FIG. 6B is a graph of a wavelength of a second light source varying with time for an SS-OCT apparatus according to some embodiments. In some embodiments, the second electrical control signal 507b causes the second wavelength-tunable light source 503b to output a wavelength varying with time corresponding to the graph in FIG. 6B. In some embodiments, the second electrical control signal 507b is configured to cause a different output wavelength with respect to time for the second wavelength-tunable light source 503b from that shown in FIG. 6B.

Returning to FIG. 5B, the output of the first wavelength-tunable light source 503a is coupled into a first light source path 515, such as an optical fiber. The second wavelength-tunable light source 503b is coupled into a second light source path 516, such as an optical fiber. The first light source path 515 and the second light source path 516 are connected to an input optical coupler 517 that combines the output of the first light source 503a and the output of the second light source 503b into a multiplexed optical signal 508 (FIG. 5A) and splits the multiplexed optical signal 508 into a reference optical signal 509 (FIG. 5A) traveling through a reference optical path 518, such as an optical fiber; and a sample optical signal 510 traveling through a sample signal path 519, such as an optical fiber. The reference signal path 518 is connected to a reference circulator 520 that directs the reference optical signal 509 to a reference optic path 521, such as an optical fiber. The reference optic path 521 is in turn connected to a reference collimating lens 522 that collimates the reference optical signal 509 and directs the reference optical signal 509 towards a reference reflector 523. The reference reflector 523 reflects the reference optical signal 509, causing the reflected reference optical signal 509 to be coupled back into the reference optic path 521 by the reference collimating lens 522. The reflected reference optical signal 509 then enters the reference circulator 520 which directs the reflected reference optical signal 509 into a reference return path 524, such as an optical fiber.

On the sample side, the sample optical signal path 519 is connected to a sample circulator 525 that directs the sample optical signal 510 to a sample optic path 526, such as an optical fiber. A sample collimating lens 527 at the end of the sample optic path 526 collimates the sample optical signal 510 and directs the sample optical signal 510 to a beam scanning optic 528 which in turn directs the sample optical signal 510 to an objective lens 529. In some embodiments, the beam scanning optic 528 includes one or more rotatable reflective elements, such as mirrors. In some embodiments which include one dimensional scanning, the beam scanning optic 528 includes a single rotatable reflective element. In some embodiments which include two-dimensional scanning, the beam scanning optic 528 includes multiple rotatable reflective elements.

The objective lens 529 focusses the sample optical signal 510 onto the sample 501 and collects the backscattered optical signal 511 that includes the light scattered by the sample 501 back towards the objective lens 529. The backscattered optical signal 511 returns back through the same path to the signal circulator 525 which directs the backscattered optical signal 511 to a sample return path 530, such as an optical fiber. The reference return path 524 and the sample return path 530 are connected to a return optical coupler 532 that interferes the reference optical signal 509 and backscattered optical signal 511, producing an optical interference signal 512.

In some embodiments, the optical interference signal 512 includes multiple complementary outputs 512a and 512b of the return optical coupler 531. In some embodiments, the optical detector 505 includes a balanced photodetector that detects a difference between the two complementary outputs 512a and 512b. The optical detector 505 then outputs an electrical interference signal 513.

Figure 6C:
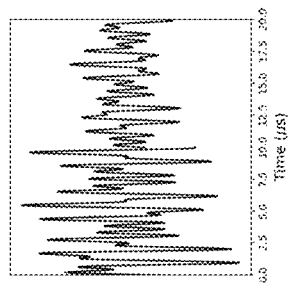
FIG. 6C is a graph of an interference signal detected by the detector of an SS-OCT apparatus versus time according to some embodiments.

FIG. 6C is a graph of an interference signal detected by the detector of an SS-OCT apparatus versus time according to some embodiments. In some embodiments, FIG. 6C is an example of the electrical interference signal 513 versus time in the SS-OCT apparatus 500B. The electrical interference signal 513 over the first time interval is the electrical interference signal 513 obtained over the wavelength range of the first wavelength-tunable light source 503a, and the electrical interference signal 513 over the second time interval is the electrical interference signal 513 obtained over the wavelength range of the second wavelength-tunable light source 503b.

Returning to FIG. 5B, the electrical interference signal 513 is sent to the ADC 506 that converts the electrical interference signal 513 to a digital interference signal 514 that is sent to the controller 502. The controller 502 then extracts the measured interference signal vector, plotted in the wavenumber domain. The controller 502 determines a depth profile based on the extracted measured interference signal vector using compressed sensing.

Figure 6D:
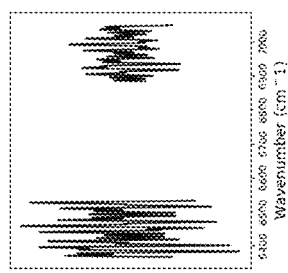
FIG. 6D is a graph of an interference signal detected by the detector of an SS-OCT apparatus in wavenumber space according to some embodiments.

FIG. 6D is a graph of an interference signal detected by the detector of an SS-OCT apparatus in wavenumber space according to some embodiments. In some embodiments, FIG. 6D indicates a result of the extraction of the measured inference signal vector by the controller 502.

Figure 6E:
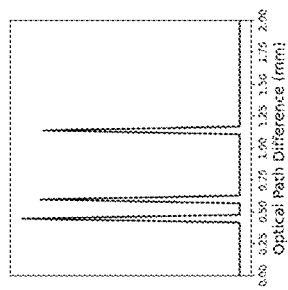
FIG. 6E is a graph of a depth profile obtained using an SS-OCT apparatus using compressed sensing to extract the depth profile from the interference signal according to some embodiments.

FIG. 6E is a graph of a depth profile obtained using an SS-OCT apparatus using compressed sensing to extract the depth profile from the interference signal according to some embodiments. In some embodiments, FIG. 6D indicates a result of the depth profile determination using compressed sensing by the controller 502.

In some embodiments, a single input port of the input optical coupler 517 is utilized to receive an optical input. In such embodiments, the input optical coupler 517 and the return optical coupler 531 are able to be combined into a single coupler. In some single coupler embodiments, return optical signals are able to be output through an unused input port of the single coupler. This arrangement reduces a number of components and complexity of the SS-OCT apparatus. However, balanced photodetectors are not usable in the single coupler embodiments.

The above description of the SS-OCT apparatus 500B refers to two light sources. However, one of ordinary skill in the art would understand that the SS-OCT apparatus 500B includes more than two light sources, in some embodiments.

Further, the above description refers to optical fibers as an example of optical paths. In some embodiments, each of the optical fibers have a same structure. In some embodiments, at least one optical fiber has a different structure from at least one other optical fiber. In some embodiments, at least one of the optical paths is defined by an on-chip optical waveguide. In some embodiments, at least one of the optical paths is free from an optical fiber or optical waveguide and propagation of the corresponding optical signal is controlled by reflective or refractive elements other than fibers or waveguides.

In comparison with other approaches, the SS-OCT apparatus 500B is capable of generating a depth profile having narrow peaks with minimal, if any, sidelobes. As a result, the precision and accuracy of the depth profile generated using the SS-OCT apparatus 500B is improved with respect to other approaches.

Figure 5C:
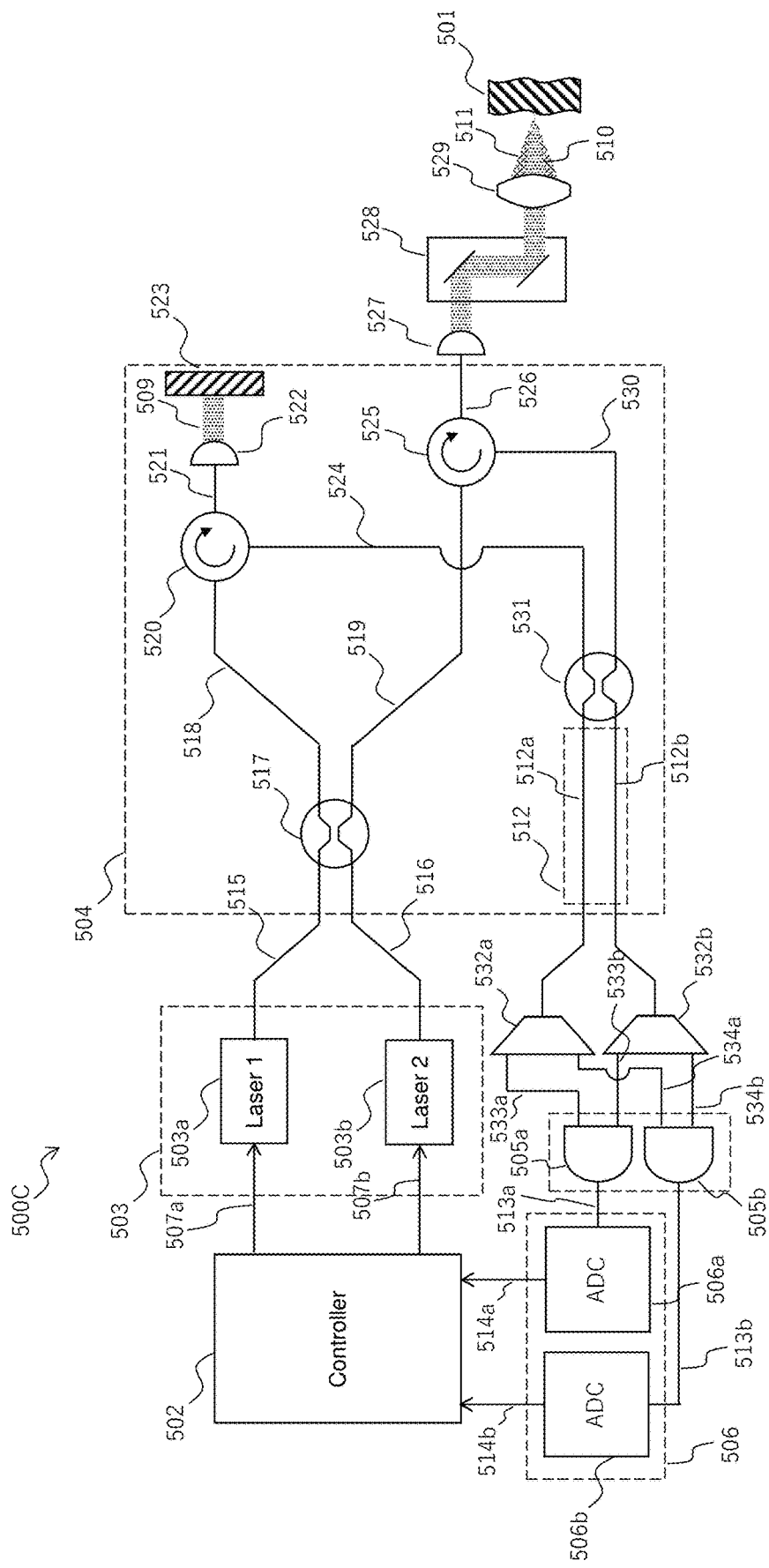
FIG. 5C is a schematic view of a SS-OCT apparatus including wavelength division multiplexing to combine the output of two wavelength-tunable light sources in accordance with some embodiments.

FIG. 5C is a schematic view of an SS-OCT apparatus 500C including wavelength division multiplexing to combine the output of two wavelength-tunable light sources in accordance with some embodiments. In comparison with the SS-OCT apparatus 500B (FIG. 5B), which used time multiplexing, the SS-OCT apparatus 500C uses wavelength division multiplexing to combine the output of two light sources and the interferometer includes a fiber-optic Michelson interferometer. For the sake of brevity, components of the SS-OCT apparatus 500C, which are similar to components of the SS-OCT apparatus 500B (FIG. 5B) are not described in detail.

FIGS. 7A-7F provide supporting figures for clarifying the operation of the SS-OCT apparatus 500C and how the depth profile of a sample is extracted using the SS-OCT apparatus 500C in accordance with some embodiments. In some embodiments, the electrical control signal 507 sent by the controller 502 includes a first electrical control signal 507a for controlling the wavelength of a first wavelength-tunable light source 503a and a second electrical control signal 507b for controlling the wavelength of a second wavelength-tunable light source 503b. The first electrical control signal 507a causes the wavelength of the first light source 503a to be tuned over a first wavelength range during a time interval. The second electrical control signal 507b causes the wavelength of the second wavelength-tunable light source 503b to be tuned over a second wavelength range during the same time interval.

FIG. 7A is a graph of a wavelength of a first light source varying with time for an SS-OCT apparatus according to some embodiments. In some embodiments, the first electrical control signal 507a causes the first wavelength-tunable light source 503a to output a wavelength varying with time corresponding to the graph in FIG. 7A. In some embodiments, the first electrical control signal 507a is configured to cause a different output wavelength with respect to time for the first wavelength-tunable light source 503a from that shown in FIG. 7A.

FIG. 7B is a graph of a wavelength of a second light source varying with time for an SS-OCT apparatus according to some embodiments. In some embodiments, the second electrical control signal 507b causes the second wavelength-tunable light source 503b to output a wavelength varying with time corresponding to the graph in FIG. 7B. In some embodiments, the second electrical control signal 507b is configured to cause a different output wavelength with respect to time for the second wavelength-tunable light source 503b from that shown in FIG. 7B. In comparison with FIGS. 6A-6B, the graphs of FIGS. 7A-7B include varying output wavelengths during a same period in time, but at different wavelengths.

The output of the first wavelength-tunable light source 503a is coupled into a first light source path 515. The second wavelength-tunable light source 503b is coupled into a second light source path 516. The first light source path 515 and the second light source path 516 are connected to an input optical coupler 517 that combines the output of the first light source 503a and the output of the second light source 503b into a multiplexed optical signal 508 and splits the multiplexed optical signal 508 into a reference optical signal 509 and a sample optical signal 510. The reference optical signal travels through a reference signal path 518. The sample optical signal 510 travels through a sample signal path 519. The reference signal path 518 is connected to a reference circulator 520 that directs the reference optical signal 509 to a reference optic path 521. The reference optic path 521 is in turn connected to a reference collimating lens 522 that collimates the reference optical signal 509 and directs the collimated reference optical signal 509 towards a reference reflector 523. The reference reflector 523 reflects the reference optical signal 509, causing reflected reference optical signal 509 to be coupled back into the reference optic path 521 by the reference collimating lens 522. The reference optical signal 509 then enters the reference circulator 520 which directs the reference optical signal 509 into a reference return path 524.

On the sample side, the sample optical signal fiber 519 is connected to a sample circulator 525 that directs the sample optical signal 510 to a sample optic path 526. A sample collimating lens 527 at the end of the sample optic path 526 collimates the sample optical signal 510 and directs the sample optical signal 510 to a beam scanning optic 528 which in turn directs the sample optical signal 510 to an objective lens 529. The objective lens 529 focusses the sample optical signal 510 onto the sample 501 and collects the backscattered optical signal 511 that includes the light scattered by the sample 501 back towards the objective lens 529. The backscattered optical signal 511 returns back through the same path to the signal circulator 525 which directs the backscattered optical signal 511 to a sample return path 530.

The reference return path 524 and the sample return path 530 are connected to a return optical coupler 532 that interferes the reference optical signal 509 and backscattered optical signal 511, producing an optical interference signal 512. In some embodiments, the optical interference signal 512 includes two complementary outputs 512a and 512b from the return optical coupler 531. The first complementary output 512a is coupled to a first demultiplexer 532a that splits the first complementary output 512a into a first complementary output over the first wavelength range 533a and a first complementary output over the second wavelength range 534a.

The second complementary output 512b is coupled to a second demultiplexer 532b that splits the second complementary output 512b into a second complementary output over the first wavelength range 533b and a second complementary output over the second wavelength range 534b. The optical detector 505 includes two balanced photodetectors. A first balanced photodetector 505a receives the first complementary output over the first wavelength range 533a and the second complementary output over the first wavelength range 533b and detects the electrical signal over the first wavelength range 513a. A second balanced photodetector 505b receives the first complementary output over the second wavelength range 534a and the second complementary output over the second wavelength range 534*b* and detects the electrical interference signal over the second wavelength range 513*b*.

FIG. 7C is a graph of an interference signal over the wavelength range of the first light source varying in time according to some embodiments. In some embodiments, FIG. 7C corresponds to the electrical interference signal over the first wavelength range 513*a*, as detected by the first balanced photodetector 505*a*.

FIG. 7D is a graph of an interference signal over the wavelength range of the second light source varying in time according to some embodiments. In some embodiments, FIG. 7D corresponds to the electrical interference signal over the second wavelength range 513*b*, as detected by the second balanced photodetector 505*b*.

The electrical interference signal over the first wavelength range 513*a* is transferred to a first ADC 506*a*. The first ADC 506*a* converts the electrical interference signal to a first digital interference signal 514*a*, which is transmitted to the controller 502. The electrical interference signal over the second wavelength range 513*b* is transferred to a second ADC 506*b*. The second ADC 506*d* converts the electrical interference signal to a second digital interference signal 514*b* which is transmitted to the controller 502 for processing. The controller 502 then extracts the measured interference signal vector, plotted in the wavenumber domain. In the SS-OCT apparatus 500C, the measured interference signal vector is only defined for wavenumbers that are emitted by either of the two light sources. Using compressed sensing, the controller 502 extracts a depth profile from the measured interference signal vector.

FIG. 7E is a graph of an interference signal detected by the detector of an SS-OCT apparatus plotted in wavenumber space according to some embodiments. In some embodiments, FIG. 7E indicates a result of the extraction of the measured inference signal vector by the controller 502.

FIG. 7F is a view of a depth profile obtained with an SS-OCT when compressed sensing is used to extract the depth profile from the interference signal according to some embodiments. In some embodiments, FIG. 7F indicates a result of the depth profile determination using compressed sensing by the controller 502.

In comparison with the SS-OCT apparatus 500B, the SS-OCT apparatus 500C utilizes a different multiplexing scheme, i.e., wavelength division multiplexing instead of time multiplexing. However, the use of the multiple wavelength-tunable light sources along with compressed sensing still generates a depth profile having narrow peaks with minimal, if any, sidelobes. As a result, the precision and accuracy of the depth profile generated using the SS-OCT apparatus 500C is improved with respect to other approaches.

Figure 5D:
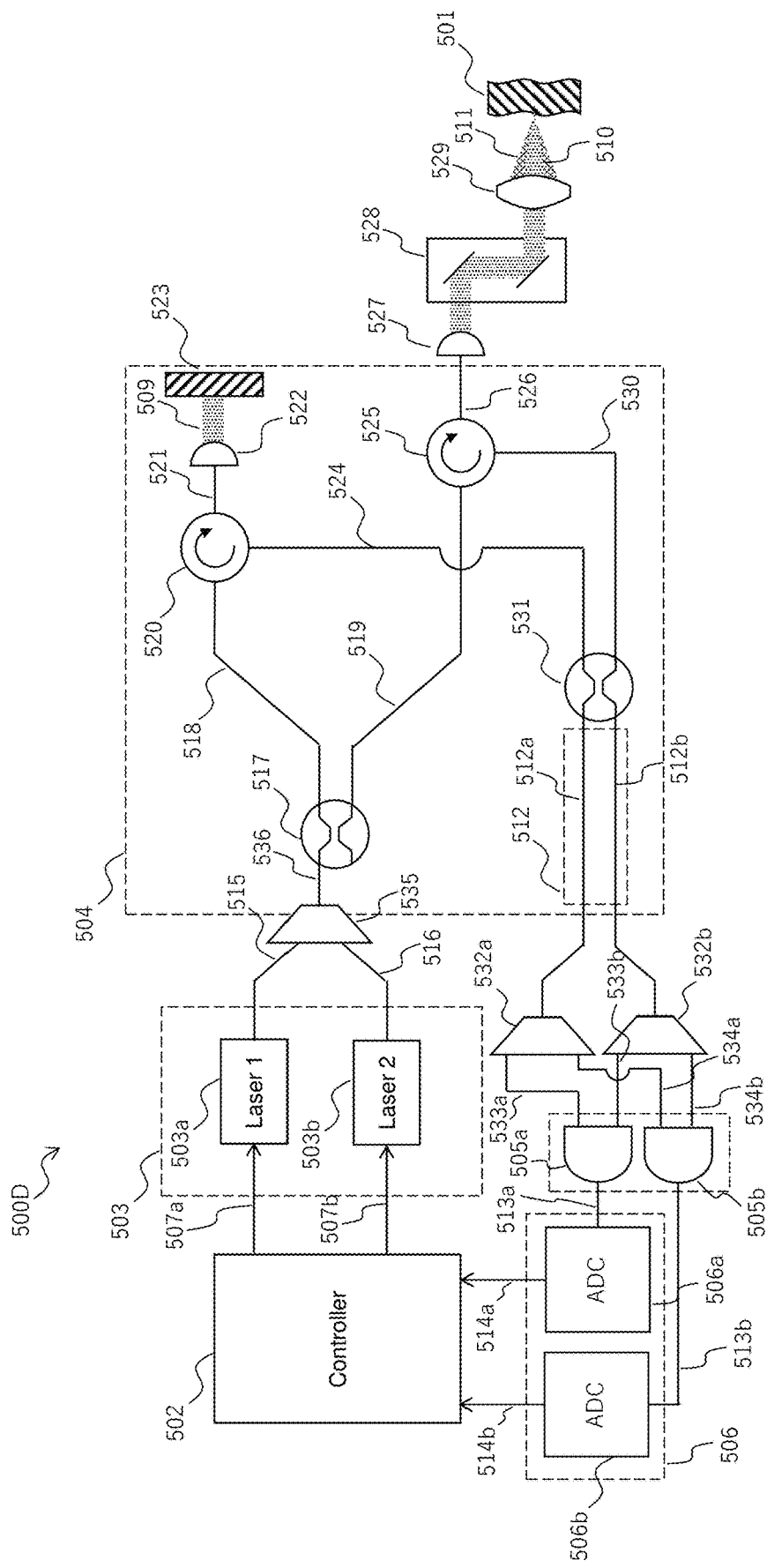
FIG. 5D is a schematic view of a SS-OCT apparatus including wavelength division multiplexing to combine the output of two wavelength-tunable light sources in accordance with some embodiments.

FIG. 5D is a schematic view of a SS-OCT apparatus 500D including wavelength division multiplexing to combine the output of two wavelength-tunable light sources in accordance with some embodiments. In comparison with the SS-OCT apparatus 500C (FIG. 5C), the SS-OCT apparatus 500D has the output of the first wavelength-tunable light source 503*a* and the output of the second wavelength-tunable light source 503*b* combined by a wavelength division multiplexer 535 that is connected to the input optical coupler 517 by a multiplexed signal fiber 536. For the sake of brevity, components of the SS-OCT apparatus 500D, which are similar to components of the SS-OCT apparatus 500C (FIG. 5C) are not described in detail.

In comparison with the SS-OCT apparatus 500C, the SS-OCT apparatus 500D utilizes a multiplexer for inputting the optical signals into the interferometer 504. However, the use of the multiple wavelength-tunable light sources along with compressed sensing still generates a depth profile having narrow peaks with minimal, if any, sidelobes. As a result, the precision and accuracy of the depth profile generated using the SS-OCT apparatus 500D is improved with respect to other approaches.

FIGS. 8A-8D provide supporting figures for clarifying the operation of the SS-OCT apparatus 500D and how the depth profile of a sample is extracted using the SS-OCT apparatus 500D in accordance with some embodiments. In some embodiments, the discussion below regarding the operation of the SS-OCT apparatus is also applicable to the SS-OCT apparatus 500A (FIG. 5A), the SS-OCT apparatus 500B (FIG. 5B), the SS-OCT apparatus 500C (FIG. 5C), or another suitable SS-OCT apparatus.

FIG. 8A is a view of a combination of wavelength ranges usable in an SS-OCT apparatus in accordance with some embodiments. FIG. 8A includes an example where two light sources with broad non-overlapping wavelength ranges. Such a combination of wavelength ranges is achievable by using for example, two swept-source lasers centered on different telecommunications bands, two sampled-grating distributed Bragg reflector lasers centered on different telecommunications bands, or any other combination of broadly tunable wavelength-tunable light source.

FIG. 8B is a view of a combination of wavelength ranges usable in an SS-OCT apparatus in accordance with some embodiments. FIG. 8B includes an example where a light source with a broad wavelength range and a light source with a narrow wavelength range are used. Such a combination of wavelength ranges is achievable with a swept-source laser and a distributed feedback laser, a sampled-grating distributed Bragg reflector laser and a distributed feedback laser, or any other combination of a broadly tunable laser and narrowly tunable laser.

Figure 8C:
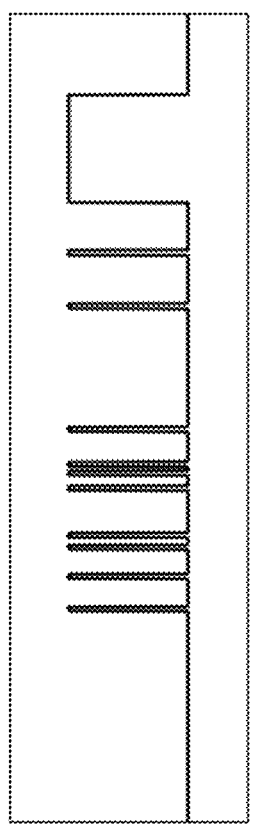
FIG. 8C is a view of a combination of wavelength ranges usable in an SS-OCT apparatus in accordance with some embodiments.

FIG. 8C is a view of a combination of wavelength ranges usable in an SS-OCT apparatus in accordance with some embodiments. FIG. 8C includes an example where a light source with a broad wavelength range and several light sources with narrow wavelength ranges are used. Such a combination of wavelength ranges is achievable with a swept-source laser and multiple distributed feedback lasers, a sampled-grating distributed Bragg reflector laser and several distributed feedback lasers, or any combination of a broadly tunable laser with multiple narrowly tunable lasers.

Figure 8D:
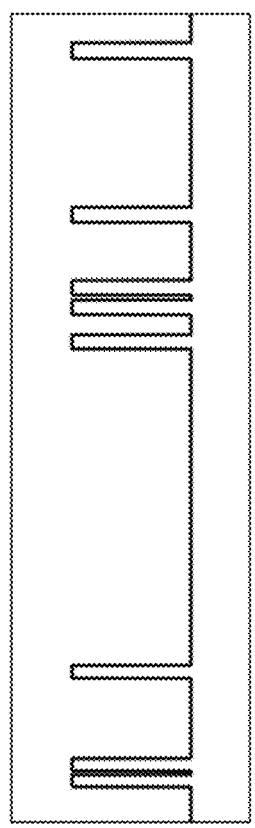
FIG. 8D is a view of a combination of wavelength ranges usable in an SS-OCT apparatus in accordance with some embodiments.

FIG. 8D is a view of a combination of wavelength ranges usable in an SS-OCT apparatus in accordance with some embodiments. FIG. 8D includes an example where several light sources with narrow wavelength ranges are used. Such a combination of wavelength ranges is achievable with multiple distributed feedback lasers, multiple distributed Bragg reflector lasers, or any combination of multiple narrowly tunable light sources. One of ordinary skill in the art would understand that although the wavelength ranges of individual light sources have been shown in these figures as continuous bands, in practice, the light sources are tuned discontinuously over their wavelength range in a uniform or non-uniform manner, in some embodiments.

The above description includes a use of all available light sources in the SS-OCT apparatus. However, one of ordinary skill in the art would recognize that in some embodiments, use of less than all light sources in the SS-OCT apparatus is possible. As discussed above, selecting different wavelength ranges based on a sample to be processed helps to improve resolution. Including a larger number of light sources and selectively operating two or more of the light sources during operation will improve the usefulness of the SS-OCT apparatus across different applications. The control of the light sources is capable of being implemented by the controller, e.g., controller 502, which generates the electrical control signal, e.g., electrical control signal 507, for controlling the light sources. In some embodiments, a user is able to enter a type of sample to be analyzed and the controller is able to determine which light sources and which wavelength ranges to utilize in order to generate the depth profile. In some embodiments, the controller is able us refer to a look-up table to determine the light sources and wavelength ranges to be utilized based on the information received from the user.

Figure 9:
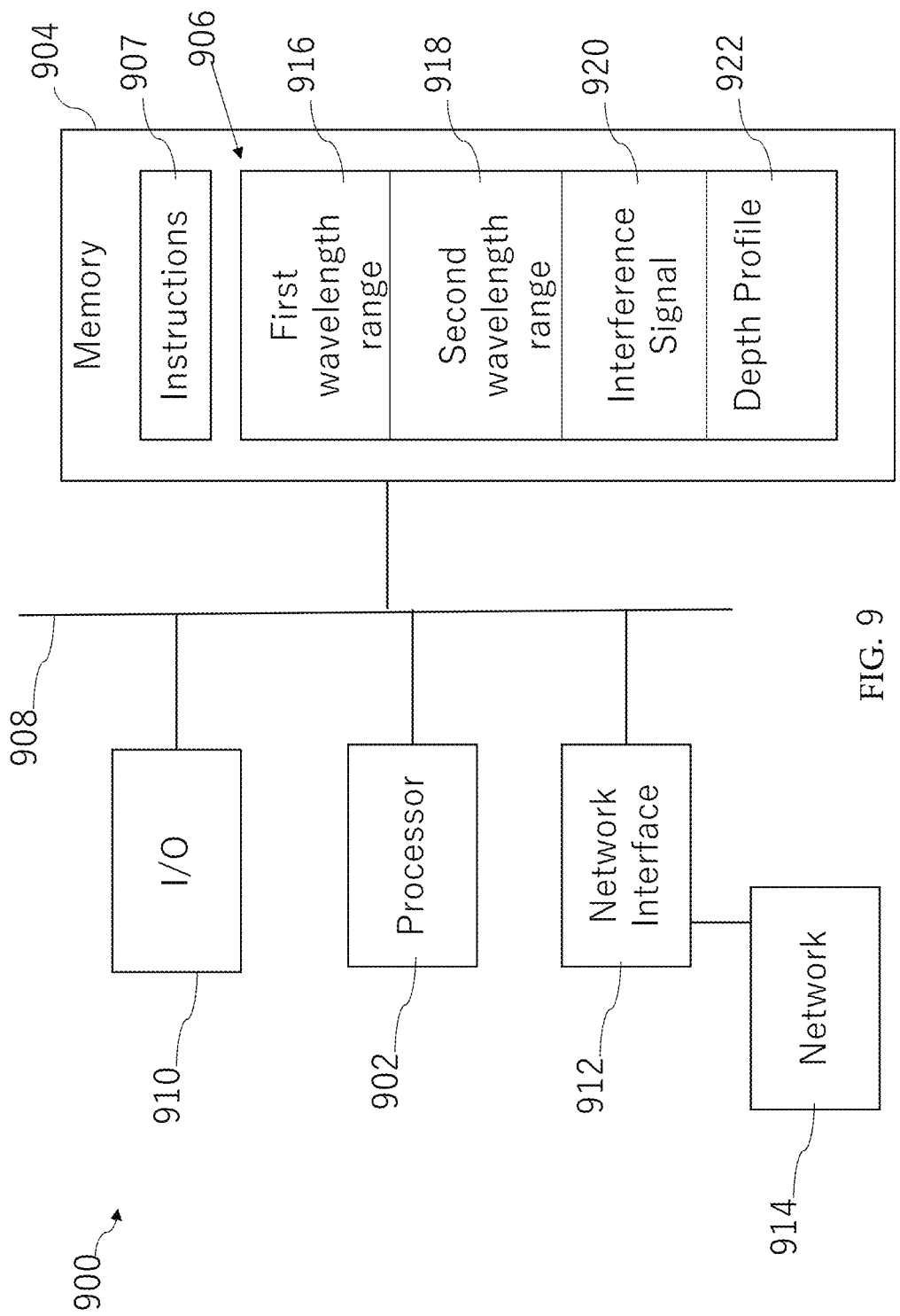
FIG. 9 is a schematic view of a controller 900 for extracting a depth profile based on information from an SS-OCT apparatus using compressed sensing in accordance with some embodiments.

FIG. 9 is a schematic view of a controller 900 for extracting a depth profile based on information from an SS-OCT apparatus using compressed sensing in accordance with some embodiments. Controller 900 includes a hardware processor 902 and a non-transitory, computer readable storage medium 904 encoded with, i.e., storing, the computer program code 906, i.e., a set of executable instructions. Computer readable storage medium 904 is also encoded with instructions 907 for interfacing with external devices. The processor 902 is electrically coupled to the computer readable storage medium 904 via a bus 908. The processor 902 is also electrically coupled to an input/output (I/O) interface 910 by bus 908. A network interface 912 is also electrically connected to the processor 902 via bus 908. Network interface 912 is connected to a network 914, so that processor 902 and computer readable storage medium 904 are capable of connecting to external elements via network 914. The processor 902 is configured to execute the computer program code 906 encoded in the computer readable storage medium 904 in order to cause controller 900 to be usable for performing a portion or all of the operations as described in with respect to the SS-OCT apparatus 500 (FIG. the SS-OCT apparatus 500B (FIG. 5B), the SS-OCT apparatus 500C (FIG. 5C), the SS-OCT apparatus 500D (FIG. 5D), or another suitable SS-OCT apparatus.

In some embodiments, the processor 902 is a central processing unit (CPU), a multi-processor, a distributed processing system, an application specific integrated circuit (ASIC), Field Programmable Gate Array (FPGA), and/or a suitable processing unit.

In some embodiments, the computer readable storage medium 904 is an electronic, magnetic, optical, electromagnetic, infrared, and/or a semiconductor system (or apparatus or device). For example, the computer readable storage medium 904 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 504 includes a compact disk-read only memory (CD-ROM), a compact disk-read/write (CD-R/W), and/or a digital video disc (DVD).

In some embodiments, the storage medium 904 stores the computer program code 906 configured to cause controller 900 to perform a portion or all of the operations as described in with respect to the SS-OCT apparatus 500 (FIG. 5A), the SS-OCT apparatus 500B (FIG. 5B), the SS-OCT apparatus 500C (FIG. 5C), the SS-OCT apparatus 500D (FIG. 5D), or another suitable SS-OCT apparatus. In some embodiments, the storage medium 904 also stores information used for performing a portion or all of the operations as described in with respect to the SS-OCT apparatus 500 (FIG. 5A), the SS-OCT apparatus 500B (FIG. 5B), the SS-OCT apparatus 500C (FIG. 5C), the SS-OCT apparatus 500D (FIG. 5D), or another suitable SS-OCT apparatus; as well as information generated during performing a portion or all of the operations as described in with respect to the SS-OCT apparatus 500 (FIG. 5A), the SS-OCT apparatus 500B (FIG. 5B), the SS-OCT apparatus 500C (FIG. 5C), the SS-OCT apparatus 500D (FIG. 5D), or another suitable SS-OCT apparatus. In some embodiments, the information includes a first wavelength range parameter 916, a second wavelength range parameter 918, an interference signal parameter 920, a depth profile parameter 922, and/or a set of executable instructions to perform the operation of a portion or all of the operations as described in with respect to the SS-OCT apparatus 500 (FIG. 5A), the SS-OCT apparatus 500B (FIG. 5B), the SS-OCT apparatus 500C (FIG. 5C), the SS-OCT apparatus 500D (FIG. 5D), or another suitable SS-OCT apparatus.

In some embodiments, the storage medium 904 stores instructions 907 for interfacing with external devices. The instructions 907 enable processor 902 to generate instructions readable by the external devices to effectively implement a portion or all of the operations as described in with respect to the SS-OCT apparatus 500 (FIG. 5A), the SS-OCT apparatus 500B (FIG. 5B), the SS-OCT apparatus 500C (FIG. 5C), the SS-OCT apparatus 500D (FIG. 5D), or another suitable SS-OCT apparatus.

Controller 900 includes I/O interface 910. I/O interface 910 is coupled to external circuitry. In some embodiments, I/O interface 910 includes a keyboard, keypad, mouse, trackball, trackpad, and/or cursor direction keys for communicating information and commands to processor 902.

Controller 900 also includes network interface 912 coupled to the processor 902. Network interface 912 allows controller 900 to communicate with network 914, to which one or more other computer systems are connected. Network interface 912 includes wireless network interfaces such as BLUETOOTH, WIFI, WIMAX, GPRS, or WCDMA; or wired network interface such as ETHERNET, USB, or IEEE-1394. In some embodiments, a portion or all of the operations as described in with respect to the SS-OCT apparatus 500 (FIG. 5A), the SS-OCT apparatus 500B (FIG. 5B), the SS-OCT apparatus 500C (FIG. 5C), the SS-OCT apparatus 500D (FIG. 5D), or another suitable SS-OCT apparatus is implemented in two or more controllers 900, and information such as first wavelength range, second wavelength range, interference signal, and depth profile are exchanged between different controller 900 via network 914.

An aspect of this description relates to a swept-source optical coherence tomography (SS-OCT) apparatus. The SS-OCT apparatus includes a plurality of wavelength-tunable light sources. The SS-OCT apparatus further includes a first optical coupler configured to receive an output from each of the plurality of wavelength-tunable light sources, wherein the optical coupler is configured to split the received output from each of the plurality of wavelength-tunable light sources into a reference optical path and a sample optical path, and the sample optical path is configured to illuminate a sample. The SS-OCT apparatus further includes a second optical coupler configured to receive return optical signals from each of the reference optical path and the sample optical path, wherein the second optical coupler is configured to output an optical interference signal. The SS-OCT apparatus further includes a detector configured to detect the optical interference signal. The SS-OCT apparatus further includes a controller configured to receive an electrical signal based on the detected optical interference signal, wherein the controller is configured to generate a depth profile of the sample based on the received electrical signal using compressed sensing. In some embodiments, the controller is further configured to generate a plurality of control signals, wherein each of the plurality of control signals is configured to control an output wavelength of a corresponding wavelength-tunable light source of the plurality of wavelength-tunable light sources. In some embodiments, the controller is configured to generate the plurality of control signals for time multiplexing of the output of each of the plurality of wavelength-tunable light sources. In some embodiments, the controller is configured to generate the plurality of control signals for wavelength division multiplexing of the output of each of the plurality of wavelength-tunable light sources. In some embodiments, the SS-OCT apparatus further includes an analog-to-digital converter configured to convert an electrical signal from the detector into a digital signal, and to transfer the digital signal to the controller. In some embodiments, the SS-OCT apparatus further includes a multiplexer between the plurality of wavelength-tunable light sources and the first optical coupler. In some embodiments, the SS-OCT apparatus further includes a multiplexer between the second optical coupler and the detector. In some embodiments, the first optical couple and the second optical coupler are a same structure. In some embodiments, the controller is configured to apply the compressed sensing by finding the depth profile vector x that minimize the LASSO operator described by, $$\min \frac{1}{2} \|Ax - y\|_2^2 + \alpha \|x\|_1$$

where y is the measured interference signal vector, A is the transform matrix that transforms a depth profile vector to be extracted to a measured interference signal vector, and $\alpha$ is a constant Lagrangian multiplier. In some embodiments, a first wavelength-tunable light source of the plurality of wavelength-tunable light sources includes a sampled-grating distributed Bragg reflector laser, and a second wavelength-tunable light source of the plurality of wavelength-tunable light sources includes a distributed feedback laser. In some embodiments, each of the plurality of wavelength-tunable light sources includes a sampled-grating distributed Bragg reflector laser.

An aspect of this description relates to a method of generating a depth profile using a swept-source optical coherence tomography (SS-OCT) apparatus. The method includes outputting a plurality of optical signals using a plurality of wavelength-tunable light sources. The method further includes splitting the plurality of optical signals from the plurality of wavelength-tunable light sources into a reference optical path and a sample optical path. The method further includes illuminating a sample using the sample optical path. The method further includes interfering return optical signals from each of the reference optical path and the sample optical path to generate an optical interference signal. The method further includes detecting the optical interference signal. The method further includes generating, using a controller, the depth profile based on the interference signal using compressed sensing. In some embodiments, the method further includes generating a plurality of control signals, wherein each of the plurality of control signals controls an output wavelength of a corresponding wavelength-tunable light source of the plurality of wavelength-tunable light sources. In some embodiments, generating the plurality of control signals includes generating the plurality of control signals for time multiplexing of the plurality of wavelength-tunable light sources. In some embodiments, generating the plurality of control signals includes generating the plurality of control signals for wavelength division multiplexing of the plurality of wavelength-tunable light sources. In some embodiments, the method further includes converting the detected optical interference signal into a digital signal; and transferring the digital signal to the controller. In some embodiments, the method further includes demultiplexing the output of the plurality of wavelength-tunable light sources prior to splitting the plurality of optical signal into the reference optical path and the sample optical path. In some embodiments, the method further includes multiplexing the optical interference signal prior to detecting the optical interference signal. In some embodiments, generating the depth profile using compressed sensing includes finding the depth profile vector x that minimize the LASSO operator described by, $$\min \frac{1}{2} \|Ax - y\|_2^2 + \alpha \|x\|_1$$

where y is the measured interference signal vector, A is the transform matrix that transforms a depth profile vector to be extracted to a measured interference signal vector, and $\alpha$ is a constant Lagrangian multiplier.

An aspect of this description relates to a swept-source optical coherence tomography (SS-OCT) apparatus. The SS-OCT apparatus includes a plurality of wavelength-tunable light sources, wherein each of the plurality of wavelength-tunable light sources is configured to receive a corresponding control signal of a plurality of control signals. The SS-OCT apparatus further includes a first optical coupler configured to receive an output from each of the plurality of wavelength-tunable light sources. The first optical coupler is configured to split the received output from each of the plurality of wavelength-tunable light sources into a reference optical path configured to illuminate a reference optical surface, and a sample optical path configured to illuminate a sample. The SS-OCT apparatus further includes a return reference optical path configured to receive reflected light from the reference optical surface. The SS-OCT apparatus further includes a return sample optical path configured to receive backscattered light from the sample. The SS-OCT apparatus further includes a second optical coupler configured to interfere an output of the return reference optical path with an output of the return sample optical path to generate an optical interference signal. The SS-OCT apparatus further includes a detector configured to detect the optical interference signal. The SS-OCT apparatus further includes a controller configured to receive an electrical signal based on the detected optical interference signal. The controller is configured to generate a depth profile of the sample based on the received electrical signal using compressed sensing, and generate the plurality of control signals. In some embodiments, the controller is configured to apply the compressed sensing by finding the depth profile vector x that minimize the LASSO operator described by, $$\min \frac{1}{2} \|Ax - y\|_2^2 + \alpha \|x\|_1$$

where y is the measured interference signal vector, A is the transform matrix that transforms a depth profile vector to be extracted to a measured interference signal vector, and α is a constant Lagrangian multiplier.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A swept-source optical coherence tomography (SS-OCT) apparatus comprising:
   a plurality of wavelength-tunable light sources;
   a first optical coupler configured to receive an output from each of the plurality of wavelength-tunable light sources, wherein the optical coupler is configured to split the received output from each of the plurality of wavelength-tunable light sources into a reference optical path and a sample optical path, and the sample optical path is configured to illuminate a sample;
   a second optical coupler configured to receive return optical signals from each of the reference optical path and the sample optical path, wherein the second optical coupler is configured to output an optical interference signal;
   a detector configured to detect the optical interference signal; and
   a controller configured to receive an electrical signal based on the detected optical interference signal and generate an interference signal vector based on the received electrical signal, wherein the controller is configured to generate a depth profile vector of the sample based on the interference signal vector using compressed sensing,
   wherein center wavelengths of the plurality of wavelength-tunable light sources are chosen such that mutual coherence of a transform matrix that transforms the depth profile vector to the interference signal vector is minimized.

2. The SS-OCT apparatus according to claim 1, wherein the controller is further configured to generate a plurality of control signals, wherein each of the plurality of control signals is configured to control an output wavelength of a corresponding wavelength-tunable light source of the plurality of wavelength-tunable light sources.

3. The SS-OCT apparatus according to claim 2, wherein the controller is configured to generate the plurality of control signals for time multiplexing of the output of each of the plurality of wavelength-tunable light sources.

4. The SS-OCT apparatus according to claim 2, wherein the controller is configured to generate the plurality of control signals for wavelength division multiplexing of the output of each of the plurality of wavelength-tunable light sources.

5. The SS-OCT apparatus according to claim 1, further comprising an analog-to-digital converter configured to convert an electrical signal from the detector into a digital signal, and to transfer the digital signal to the controller.

6. The SS-OCT apparatus according to claim 1, further comprising a multiplexer between the plurality of wavelength-tunable light sources and the first optical coupler.

7. The SS-OCT apparatus according to claim 1, further comprising a multiplexer between the second optical coupler and the detector.

8. The SS-OCT apparatus according to claim 1, wherein the controller is configured to apply the compressed sensing by:
   finding the depth profile vector x that minimizes the LASSO operator described by, $$\min \frac{1}{2} \|Ax - y\|_2^2 + \alpha \|x\|_1$$

where y is the measured interference signal vector, A is the transform matrix that transforms a depth profile vector to be extracted to a measured interference signal vector, and α is a constant Lagrangian multiplier.

9. The SS-OCT apparatus of claim 1, wherein a first wavelength-tunable light source of the plurality of wavelength-tunable light sources comprises a sampled-grating distributed Bragg reflector laser, and a second wavelength-tunable light source of the plurality of wavelength-tunable light sources comprises a distributed feedback laser.

10. The SS-OCT apparatus of claim 1, wherein the first optical coupler and the second optical coupler are a same structure.

11. The SS-OCT apparatus of claim 1, wherein each of the plurality of wavelength-tunable light sources comprises a sampled-grating distributed Bragg reflector laser.

12. A method of generating a depth profile vector using a swept-source optical coherence tomography (SS-OCT) apparatus, the method comprising:
   outputting a plurality of optical signals using a plurality of wavelength-tunable light sources;
   splitting the plurality of optical signals from the plurality of wavelength-tunable light sources into a reference optical path and a sample optical path;
   illuminating a sample using the sample optical path;
   interfering return optical signals from each of the reference optical path and the sample optical path to generate an optical interference signal;
   detecting the optical interference signal;
   generating an electrical signal based on the detected optical interference signal;
   generating an interference signal vector based on the generated electrical signal; and
   generating, using a controller, the depth profile vector based on the interference signal vector using compressed sensing,
   wherein center wavelengths of the plurality of wavelength-tunable light sources are chosen such that mutual coherence of a transform matrix that transforms the depth profile vector to the interference signal vector is minimized.

13. The method according to claim 12, further comprising generating a plurality of control signals, wherein each of the plurality of control signals controls an output wavelength of a corresponding wavelength-tunable light source of the plurality of wavelength-tunable light sources.

14. The method according to claim 13, wherein generating the plurality of control signals comprises generating the plurality of control signals for time multiplexing of the plurality of wavelength-tunable light sources.

15. The method according to claim 13, wherein generating the plurality of control signals comprises generating the plurality of control signals for wavelength division multiplexing of the plurality of wavelength-tunable light sources.

16. The method according to claim 12, further comprising:
   converting the detected optical interference signal into a digital signal; and
   transferring the digital signal to the controller.

17. The method according to claim 12, further comprising multiplexing the optical interference signal prior to detecting the optical interference signal.

18. The method according to claim 12, wherein generating the depth profile using compressed sensing comprises:
   finding the depth profile vector x that minimizes the LASSO operator described by, $$\min \frac{1}{2} \|Ax - y\|_2^2 + \alpha \|x\|_1$$

where y is the measured interference signal vector, A is the transform matrix that transforms a depth profile vector to be extracted to a measured interference signal vector, and α is a constant Lagrangian multiplier.

19. A swept-source optical coherence tomography (SS-OCT) apparatus comprising:
   a plurality of wavelength-tunable light sources, wherein each of the plurality of wavelength-tunable light sources is configured to receive a corresponding control signal of a plurality of control signals;
   a first optical coupler configured to receive an output from each of the plurality of wavelength-tunable light sources, wherein the first optical coupler is configured to split the received output from each of the plurality of wavelength-tunable light sources into:
      a reference optical path configured to illuminate a reference optical surface, and
      a sample optical path configured to illuminate a sample;
   a return reference optical path configured to receive reflected light from the reference optical surface;
   a return sample optical path configured to receive backscattered light from the sample;
   a second optical coupler configured to interfere an output of the return reference optical path with an output of the return sample optical path to generate an optical interference signal;
   a detector configured to detect the optical interference signal; and
   a controller configured to receive an electrical signal based on the detected optical interference signal and generate an interference signal vector based on the received electrical signal, wherein the controller is configured to:
      generate a depth profile vector of the sample based on the interference signal vector using compressed sensing, and
      generate the plurality of control signals,
   wherein center wavelengths of the plurality of wavelength-tunable light sources are chosen such that mutual coherence of a transform matrix that transforms the depth profile vector to the interference signal vector is minimized.

20. The SS-OCT apparatus according to claim 19, wherein the controller is configured to apply the compressed sensing by:
   finding the depth profile vector x that minimizes the LASSO operator described by, $$\min \frac{1}{2} \|Ax - y\|_2^2 + \alpha \|x\|_1$$

where y is the measured interference signal vector, A is the transform matrix that transforms a depth profile vector to be extracted to a measured interference signal vector, and α is a constant Lagrangian multiplier.

* * * * *

UNITED STATES PATENT AND TRADEMARK OFFICE
CERTIFICATE OF CORRECTION

| | |
|---|---|
| PATENT NO. | : 11,933,610 B2 |
| APPLICATION NO. | : 17/876453 |
| DATED | : March 19, 2024 |
| INVENTOR(S) | : John Kenji David Clark and Shigeru Nakamura |

It is certified that error appears in the above-identified patent and that said Letters Patent is hereby corrected as shown below:

On the Title Page

Item ( * ) Notice, Lines 4 to 5, remove "This patent is subject to a terminal disclaimer."

Signed and Sealed this
Eighteenth Day of June, 2024

Katherine Kelly Vidal
*Director of the United States Patent and Trademark Office*